United States Patent
Kliot et al.

(10) Patent No.: US 12,032,995 B1
(45) Date of Patent: Jul. 9, 2024

(54) ASYNCHRONOUS TASK QUEUE CONFIGURATION IN A DATABASE SYSTEM

(71) Applicant: Snowflake Inc., Bozeman, MT (US)

(72) Inventors: Gabriel Kliot, Redmond, WA (US); Ruji Xie, Bellevue, WA (US); Subramanian Muralidhar, Mercer Island, WA (US); William Waddington, Stateline, NV (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/361,549

(22) Filed: Jul. 28, 2023

(51) Int. Cl.
*G06F 9/48* (2006.01)

(52) U.S. Cl.
CPC .................. *G06F 9/4881* (2013.01)

(58) Field of Classification Search
CPC .................................................... G06F 9/4881
See application file for complete search history.

(56) References Cited

U.S. PATENT DOCUMENTS

| | | | | |
|---|---|---|---|---|
| 6,330,582 B1* | 12/2001 | Kuo | .......... | G06F 9/466 |
| | | | | 718/101 |
| 2002/0178282 A1* | 11/2002 | Mysore | .......... | H04L 47/56 |
| | | | | 709/234 |
| 2003/0236819 A1* | 12/2003 | Greubel | .......... | H04L 9/40 |
| | | | | 709/201 |
| 2008/0148271 A1* | 6/2008 | Leckie | .......... | G06F 9/5027 |
| | | | | 718/104 |
| 2016/0103702 A1* | 4/2016 | Schneider | .......... | G06F 16/25 |
| | | | | 718/101 |

OTHER PUBLICATIONS

AWS, "Amazon SQS visibility timeout", [Online]. Retrieved from the Internet: https: docs.aws.amazon.com AWSSimpleQueueService latest SQSDeveloperGuide sqs-visibility-timeout.html, (Accessed online Jan. 17, 2024), 6 pages.

AWS, "AmazonSQSClient Aws Sdk for Java 1 12 635", [Online]. Retrieved from the Internet: https: docs.aws.amazon.com AWSJavaSDK latest javadoc com amazonaws services sqs AmazonSQSClient. html, (Accessed online Jan. 17, 2024), 28 pages.

AWS, "What is Amazon Simple Queue Service", [Online]. Retrieved from the Internet: https: docs.aws.amazon.com AWSSimpleQueueService latest SQSDeveloperGuide welcome. html, (Accessed online Jan. 17, 2024), 2 pages.

(Continued)

*Primary Examiner* — Wissam Rashid
(74) *Attorney, Agent, or Firm* — Schwegman Lundberg & Woessner, P.A.

(57) ABSTRACT

A method includes decoding, by at least one hardware processor, an enqueue request received from a data process of a database system. The enqueue request includes a task. The task is enqueued in an in-memory task queue. An enqueue acknowledgment is encoded for transmission to the data process responsive to the enqueue request. The task is persisted in a storage location associated with the in-memory task queue. Initiate a lease of the task to a worker node in response to a lease request received from the worker node. A dequeue request is received from the worker node where the dequeue request indicates completion of the task by the worker node. The task is dequeued from the in-memory task queue based on the dequeue request.

30 Claims, 24 Drawing Sheets

400

(56) References Cited

OTHER PUBLICATIONS

AWS, "List Queues", [Online]. Retrieved from the Internet: https: docs.aws.amazon.com AWSSimpleQueueService latest APIReference API_ListQueues.html, (Accessed online Jan. 17, 2024), 7 pages.

AWS, "software.amazon.awssdk.services.sqs Interface SqsClient", [Online]. Retrieved from the Internet: https: sdk.amazonaws.com java api latest software amazon awssdk services sqs SqsClient.html, (Accessed online Jan. 17, 2024), 55 pages.

AWS, "ReceiveMessageRequest", [Online]. Retrieved from the Internet: https: docs.aws.amazon.com AWSJavaSDK latest javadoc com amazonaws services sqs model ReceiveMessageRequest.html#constructor.detail, (Accessed online Jan. 17, 2024), 24 pages.

AWS, "com.amazonaws.services.sqs.model Class SendMessageRequest", [Online]. Retrieved from the Internet: https: docs.aws.amazon.com AWSJavaSDK latest javadoc com amazonaws services sqs model SendMessageRequest.html, (Accessed online Jan. 17, 2024), 13 pages.

Baeldung, "Microbenchmarking with Java", [Online]. Retrieved from the Internet: https: www.baeldung.com java-microbenchmark-harness, (Accessed online Jan. 17, 2024), 9 pages.

Github GRPC, "Status codes and their use in gRPC", [Online]. Retrieved from the Internet: https: github.com grpc grpc blob master doc statuscodes.md, (Accessed online Jan. 17, 2024), 6 pages.

Microsoft Learn, "Get Messages REST API Azure Storage", [Online]. Retrieved from the Internet: https: learn.microsoft.com en-US rest api storageservices get-messages, (Accessed online Jan. 17, 2024), 7 pages.

Mozilla, "HTTP response status codes", [Online]. Retrieved from the Internet: https: developer.mozilla.org en-US docs Web HTTP Status#client_error_responses, (Accessed online Jan. 17, 2024), 9 pages.

\* cited by examiner

```
public interface AsyncTaskQueue {
/**
* Enqueues new task into the queue. If the task with this id already exists, returns an error.
* The enqueue request specifies the task id, the opaque task body, schedulingDelay and optional
* requestIdempotencyId, that can be used to retry this request.
**
@param queueId the target queue
* @param request the enqueue request
* @return response indicating the successful enqueue or failure.
*/
EnqueueResponse enqueueTask(QueueId queueId, EnqueueRequest request);
/**
* Get (lease) the next task from the queue. Each task will be given only to one consumer,
* according to lease rules.
**
@param queueId the target queue
* @param leaseRequest the type of the lease to provide (strong or weak) and lease duration.
* @param requestIdempotencyId an optional requestIdempotencyId that can be used to retry this
* request.
* @return the leased task with its lease.
*/
```

```
TaskResponse getNextTask(
QueueId queueId, LeaseRequest leaseRequest, Optional<String> requestIdempotencyId);
/**
 * Dequeue (permanently remove) the given task from the queue. If the task is not in the queue
 * (was already previously dequeued or was never enqueued), the request fails. The caller should
 * provide a lease that will be validated. If the lease does not match, the request fails.
 *
 * @param queueId the target queue
 * @param request specifies the task to be removed, lease and optional requestIdempotencyId that
 * can be used to retry this request.
 * @return response indicating the successful dequeue or failure.
 */
DequeueResponse dequeueTask(QueueId queueId, DequeueRequest request);
/**
 * Get the next task and also immediately dequeue (permanently remove) it from the queue. This
 * method is an atomic combination of getNextTask + dequeueTask.
 *
 * @param queueId the target queue
 * @param requestIdempotencyId an optional requestIdempotencyId that can be used to retry this
 * request.
 * @return the dequeued task.
 */
```

```
TaskResponse dequeueNextTask(QueueId queueId, Optional<String> requestIdempotencyId);
/**
 * Extends the current provided lease. The caller should provide a lease that will be validated.
 * If the lease does not match, the request fails.
 **
 @param queueId the target queue
 * @param request the existing lease, needs to be valid.
 * @param newLeaseRequest the type of the new lease to provide.
 *
 * @return the new extended lease.
 */
TaskResponse extendLease(
  QueueId queueId, ExtendLeaseRequest request, LeaseRequest newLeaseRequest);
// BATCH Versions:
/** A batch version of enqueueTask. */
EnqueueBatchResponse enqueueManyTasks(QueueId queueId, List<EnqueueRequest> request);
/** A batch version of getNextTask. */
TaskBatchResponse getManyNextTasks(
  QueueId queueId,
  int maxNumberOfTasks,
  LeaseRequest leaseRequest,
  Optional<String> requestIdempotencyId);
/** A batch version of dequeueTask. */
DequeueBatchResponse dequeueManyTasks(QueueId queueId, List<DequeueRequest> requests);
```

```
/** A batch version of dequeueNextTask. */
TaskBatchResponse dequeueManyNextTasks(
QueueId queueId, int maxNumberOfTasks, Optional<String> requestIdempotencyId);
/** A batch version of extendLease. */
TaskBatchResponse extendManyLeases(
QueueId queueId, List<ExtendLeaseRequest> requests, LeaseRequest newLeaseRequest);
// EXTENSIONS:
/**
 * Returns the size of the internal queues, based on Tasks states.
 **
 * @param queueId the target queue
 * @return the sizes of the internal queues.
 */
QueueSize getQueueSize(QueueId queueId);
/**
 * Tries to update the schedulingDelay of a Task. Will fail if the task is not waiting to be
 * scheduled any more.
 **
 * @param queueId the target queue
 * @param taskId the target task
 * @param schedulingDelay the new scheduling Delay
 * @return true if was able to update the schedulingDelay
 */
boolean updateSchedulingDelay(QueueId queueId, TaskId taskId, Duration schedulingDelay);
// TBD when/if priorities are supported.
// boolean updatePriority(QueueId queueId, TaskId taskId, Long priority);
/**
```

FIG. 8

```
Tries to dequeue a given task and enqueue a new one. This method is an atomic combination of
* dequeueTask(old) + enqueueTask(new). This can be useful to build multi-step workflows.
**
@param queueId the target queue
* @param prevTask the previosu task to dequeue.
* @param newTaskRequest the new task to enqueue.
* @return response indicating the successful replace or failure.
*/
TaskResponse replaceTask(QueueId queueId, DequeueRequest prevTask, EnqueueRequest newTaskRequest);
/** A batch version of replaceTask. */
TaskBatchResponse replaceTaskWithMany(
QueueId queueId, TaskId prevTaskId, Lease prevTaskLease, List<EnqueueRequest> request);
/**
* Tries to enqueue a given task and immediately get (lease) this same task. This method is an
* atomic combination of enqueueTask() + getNextTask(). Fails if the scheduling delay is non zero.
**
@param queueId the target queue
* @param request \request the enqueue request
* @param leaseRequest the type of the lease to provide.
* @return the leased task with its lease.
*/
TaskResponse enqueueAndGetTask(
QueueId queueId, EnqueueRequest request, LeaseRequest leaseRequest);
/** A batch version of enqueueAndGetTask. */
TaskBatchResponse enqueueAndGetBatchTasks(
QueueId queueId, List<EnqueueRequest> request, LeaseRequest leaseRequest);
```

PRIMARY SLICE
1. KEYED ON TASK NAME
2. FOR DIRECT ACCESS, E.G. SYSTEM$.

```
@DPOSlice(
    keys = {
        QUEUE_TOPIC,
        QUEUE_ID,
        QUEUE_SHARD,
        TASK_NAME
    },
    values = {
        TASK_UUID_BYTES,
        TASK_STATE,
        NEXT_TRANSITION_TIMESTAMP
    })
```

FIG. 12

DYNAMIC DATA SLICE
1. KEYED ON STATE AND TRANSISION TIMESTAMP
2. FOR PERSISTENCE AND RECOVERY

```
@DPOSlice(
    keys = {
        QUEUE_TOPIC,
        QUEUE_ID,
        QUEUE_SHARD,
        TASK_NAME
        NEXT_TRANSISION_TIMESTAMP,
        TASK_NAME,
    },
    values = {
        //this has all the fields except
        TASK_DATA
        TASK_UUID_BYTES,
        TASK_SMALL_DATA....
    }
)
```

FIG. 13

STATIC DATA SLICE
1. KEYED ON TASK NAME
2. FOR STORING LARGE TASK DATA

```
@DPOSlice(
  name = STATIC_DATA_SLICE,
  keys = {
    QUEUE_TOPIC,
    QUEUE_ID,
    QUEUE_SHARD,
    TASK_NAME
  },
  values = {
    TASK_UUID_BYTES,
    TASK_DATA
    ENQUEUE_TIMESTAMP
  })
```

FIG. 14

ASYNCHRONOUS TASK QUEUE CONFIGURATION IN A DATABASE SYSTEM

TECHNICAL FIELD

Embodiments of the disclosure relate generally to databases and, more specifically, to asynchronous task queue configuration in a database system in connection with reliable execution of delayed work (e.g., planned/future tasks).

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented databases, and others.

The database configuration and use can include the execution of asynchronous tasks. However, existing task processing techniques are not scalable enough and are associated with inefficient node distribution for task execution. More specifically, existing task processing techniques including tracking task generation by producers, queuing, and reliably executing long-running asynchronous tasks by consumers can be challenging and time-consuming.

BRIEF DESCRIPTION OF THE DRAWINGS

The present disclosure will be understood more fully from the detailed description given below and from the accompanying drawings of various embodiments of the disclosure.

FIG. 5, FIG. 6, FIG. 7, FIG. 8, and FIG. 9 illustrate an application programming interface (API) for accessing task queue services of the TQM of FIG. 2, in accordance with some aspects.

FIG. 12, FIG. 13, and FIG. 14 illustrate example data persistence objects (DPOs) of abstractions that define how metadata objects are stored in a database in connection with the configuration of task queue by a TQM, in accordance with some aspects.

DETAILED DESCRIPTION

Figure 1:
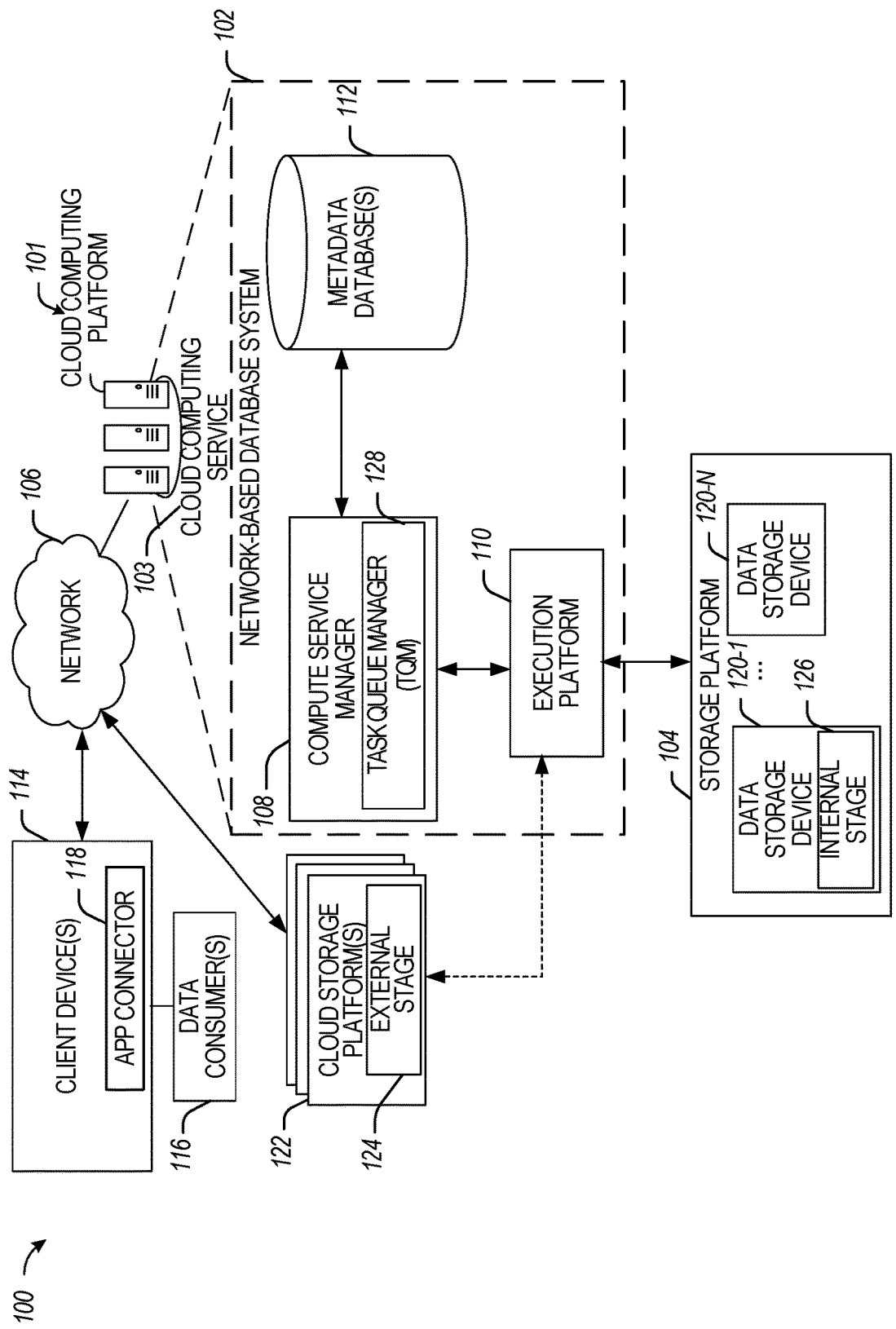
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semi-conductor-testing data, and HDF5 files are often used in industries such as the aeronautics industry, in that case for storing data such as aircraft-emissions data. Numerous other examples of unstructured-file types, semi-structured-file types, and structured-file types, as well as example use thereof, could certainly be listed here as well and will be familiar to those of skill in the relevant arts. Different people of skill in the relevant arts may classify types of files differently among these categories and may use one or more different categories instead of or in addition to one or more of these.

A data provider's internal systems can be implemented as an asynchronous processing paradigm. These include various data processing services as well as several customer features like tasks. However, existing task processing systems, including task queues, lack either manageability or scalability that are needed for efficient task distribution in database systems of scale.

The disclosed techniques include a task queue manager (TQM) which can be configured to perform task management tasks in a database system in connection with managing asynchronous work. In some aspects, the TQM can be configured to implement a task queue as well as an execution service (although the present disclosure is focused on task queue-related functionalities). In some aspects, the task queue can be implemented based on a combined in-memory and persistence state (e.g., the task queue is maintained synchronized both in-memory and in persisted storage) that allows it to scale to a larger number of processes tasks.

In some aspects, the TQM can configure the task queue to perform tasks enqueuing (e.g., upon receiving an "enqueue task" instruction including the task for enqueuing). The TQM can also configure the task queue to process a "get" instruction (e.g., "GetTaskForExecution" instruction) to allow a worker node to obtain a task from the task queue for processing. In some aspects, the worker node may also communicate a "lease" instruction allowing the worker node to work on a task for a pre-defined period. If the worker node does not complete the task within the pre-defined period, the lease can be revoked and the task state is reverted to a "ready" state and waiting for another worker node. If the worker node completes the task, the TQM can configure the task queue to accept a "DequeueTask" instruction causing the completed task to be removed from the task queue.

In some aspects, the TQM can be configured with a service application programming interface (API) to enqueue tasks, and lease tasks to work on them and dequeue them. The overall database system including the disclosed TQM can provide a serverless API (aka, a lambda) for application developers where they would specify the granularity of tasks and an application function to be invoked when the task is ready to execute. In some embodiments, the TQM can configure task queues to store tasks for subsequent execution, with different data providers being able to configure different types of task queues. In some aspects, the task queues configured by the disclosed TQM allow to decouple processing of work (tasks) from the generation of work, both in time and space, for better manageability and scalability.

The use of the disclosed techniques using a TQM and configuring of task queues are associated with the following advantages over existing task queue configuration techniques: decoupling production of new work from consumption (both in time and space), allowing scale-out consumption resources uniformly (based on queue sizes), allowing introspection of progress and remaining work in a principled and uniform way, and a smaller latency until work is completed.

The various embodiments that are described herein are described with reference, where appropriate, to one or more of the various figures. An example computing environment using a TQM is discussed in connection with FIGS. 1-3. Example configuration and functions associated with the TQM are discussed in connection with FIGS. 4-23. A more detailed discussion of example computing devices that may be used in connection with the disclosed techniques is provided in connection with FIG. 24.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104 and 122. The cloud computing platform 101 provides computing resources and storage resources that may be acquired (purchased) or leased (e.g., by users such as data providers and data consumers) and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the attribute store configuration functions described herein). The cloud computing platform 101 may include a three-tier architecture: data storage (e.g., storage platforms 104 and 122), an execution platform 110, and a compute service manager 108 providing task queue configuration and management services (e.g., functionalities of the task queue manager (TQM) 128 to configure and manage task queues using the disclosed techniques).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed task queue management functions) to multiple client accounts, including an account of the data provider associated with client device 114 and an account of the data consumer 116. In some embodiments, the compute service manager 108 comprises the TQM 128 which can be used in connection with configuring a task queue for managing asynchronous work in the network-based database system 102. A more detailed description of the functions provided by the TQM 128 is provided in connection with FIGS. 4-23.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider or another type of user) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed MT-related functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers, and providers. Such actions shall be understood to be performed concerning client devices (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., attribute store-related functions including providing features and metrics used in ML and BI-related processing) offered by the network-based database system 102 via network 106.

The compute service manager 108 is also coupled to one or more metadata databases 112 that store metadata about various functions and aspects associated with the network-based database system 102 and its users. For example, a metadata database of the one or more metadata databases 112 may include a summary of data stored in remote data storage systems as well as data available from a local cache. Additionally, a metadata database of the one or more metadata databases 112 may include information regarding how data is organized in remote data storage systems (e.g., the storage platform 104) and the local caches. Information stored by a metadata database of the one or more metadata databases 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platforms 104 and 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the storage platforms 122.

In some embodiments, communication links between elements of the computing environment 100 are implemented via one or more data communication networks, such as network 106. The one or more data communication networks may utilize any communication protocol and any type of communication medium. In some embodiments, the data communication networks are a combination of two or more data communication networks (or sub-networks) coupled with one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, one or more metadata databases 112, execution platform 110, and storage platforms 104 and 122 may be implemented as a distributed system (e.g., distributed across multiple systems/platforms at multiple geographic locations). Additionally, each of the compute service manager 108, one or more metadata databases 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database of the one or more metadata databases 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

Figure 2:
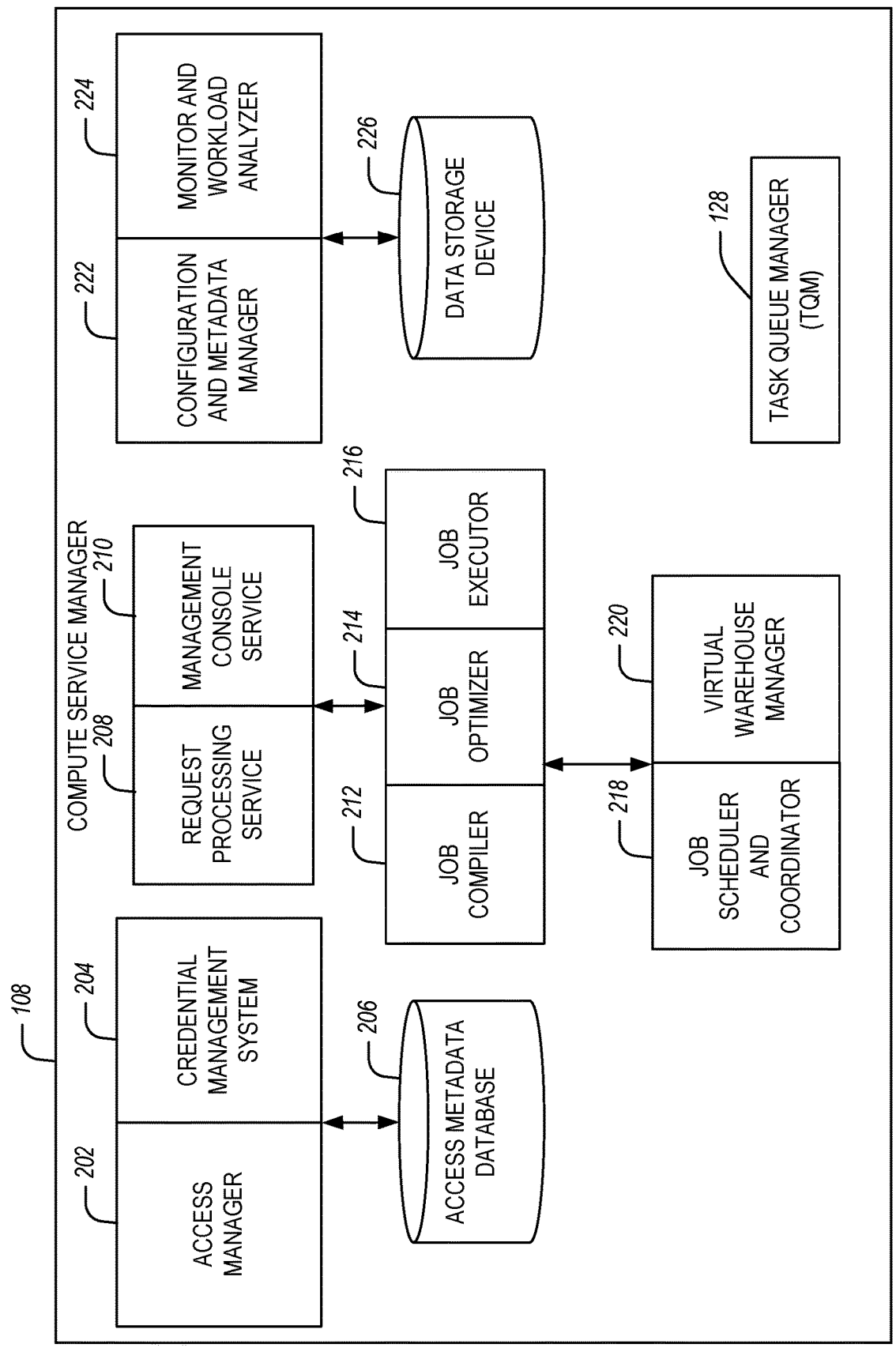
FIG. 2 is a diagram illustrating the components of a compute service manager using a task queue manager (TQM), in accordance with some embodiments of the present disclosure.

FIG. 2 is a diagram illustrating the components of the compute service manager 108 using a task queue manager (TQM), in accordance with some embodiments of the present disclosure. As shown in FIG. 2, the compute service manager 108 includes an access manager 202 and a credential management system 204 coupled to an access metadata database 206, which is an example of the one or more metadata databases 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the TQM 128 which can be used in connection with configuring a task queue for managing asynchronous work in the network-based database system 102.

Figure 3:
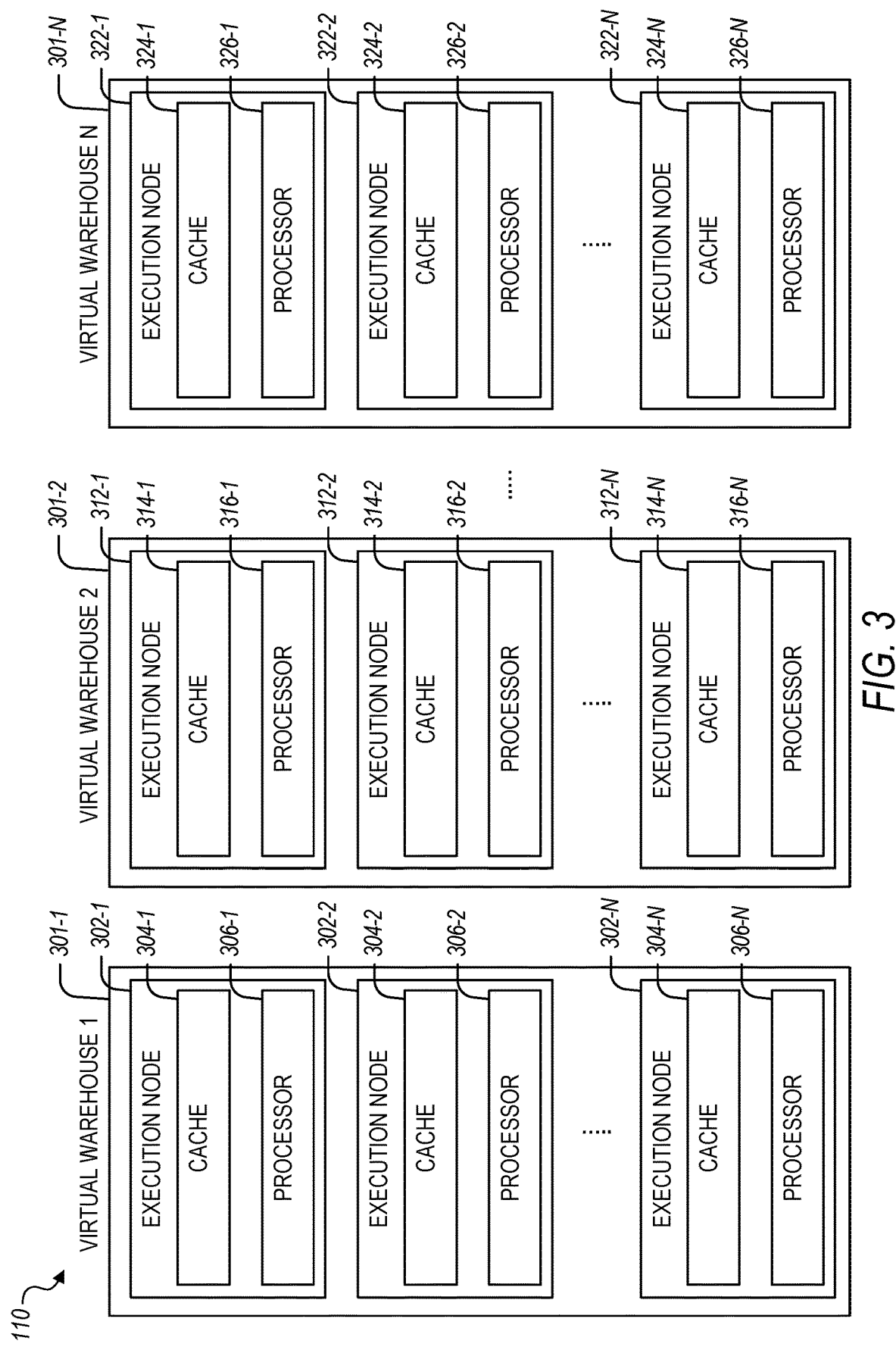
FIG. 3 is a diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, the task queue-related functionalities performed by the TQM 128 can be configured based on the following design configurations:

(a) "As a Service". In some aspects, the task queue-related functions of the TQM 128 can be provided as a service (e.g., via a remote procedure call application programming interface (RPC API), such as the API illustrated in FIG. 5-FIG. 9. In some aspects, the service can be configured as asynchronous. In this regard, distinct boundaries can be provided between the service and its client, allowing ownership, distributed development, and strong isolated APIs. The infrastructure of the network-based database system 102 can be provided as libraries and a service-oriented architecture can scale more efficiently in terms of support and management.

(b) Scalability via partitioning. In some aspects, the task queue implementation can scale for very large (e.g., virtually unlimited) rates of tasks. This configuration can be achieved by allowing a large number of small/medium size queues.

(c) Task Queue and not just work queue. In some embodiments, the TQM 128 can configure the task queue with support for managing tasks, and not just enqueuing/dequeuing work items (although simple work items would also be supported). This means the task queue does not just forget about the task when the task is taken for execution. Instead, the queue manages task states and supports delayed execution, task restart, dead letter queue, task timeouts, etc.

(d) Variety of execution semantics. In some aspects, the task queue can be configured so that tasks can be given for execution to clients. A variety of task semantics can be configured, including at most once, exactly once, and at least once. Applications can be able to pick the cheapest semantics to fit their logic.

(e) Introspection and manageability. The TQM 128 can be configured with tools for debugging and understanding the internal state of a queue and tracking task states. This can include a task log, online introspection APIs, special "admin/system$" APIs to drain queues/isolate task types, etc.

(f) Re-use internal infrastructure of the network-based database system for internal implementation, instead of building on top of existing Open Source frameworks and tools. In this regard, the task queue-related functions of the TQM 128 can be embedded natively within the network-based database system 102 infrastructure and could be managed by data processing tools native to the infrastructure.

In some embodiments, the task queue-related functions of the TQM 128 can include the following concepts and configurations.

(a) Topic (or queue-type). Specified as a free-form string. This is a logical collection of many queues identified together as belonging to one application usage. For example, the compactor workload will have one topic: CompactionTopic.

(b) Queue/partition—the topic is physically partitioned into many individual queues. Each queue can be located on one server, as one Dedicated Services Resource. The task queue can be identified by a QueueId, which can be specified as a free-form string. In some aspects, QueueId is scoped to a Topic.

(c) Task. In some aspects, an individual task is enqueued and dequeued into a single queue/partition at a time. In some aspects, the task queues configured by the TQM 128 can support atomic move operations. In some embodiments, the task can be identified by a user-provided name, which is a free-form string.

In some embodiments, the TQM 128 can include the following task naming configurations. In some aspects, applications can be allowed to specify task names. This configuration is different from many traditional queue systems, such as Amazon® AWS® Simple Queuing Service (SQS), where the service allocates the task names which results in simplifying the code of some applications. However, application code can be configured to sometimes address a specific task (e.g., to cancel it while it is still in the queue, increase its priority, or otherwise manage it directly).

Tasks can be associated with some other application-managed data. For example, in the compactor case (e.g., functionality associated with compacting a database), there is a task per cloneset. To cancel the task associated with cloneset X, the compactor needs to know this task name. If the task names were given by the queue service, the compactor code would need to store this task name on the cloneset data persistence object (DPO) after the task in enqueue. This is an extra write, which can be optimized by allowing the application to specify the task name (which in this case would be clonesetID).

In some aspects, task name uniqueness can be enforced within the queue (and not across queues in the topic). In some aspects, an application can enqueue a task to any queue, identified by QueueId (topic+partition). In this case, no prior queue creation is required, all queues (infinite) virtually exist all the time, physically only the resources for non-empty queues are consumed, and queues can be used as a means of scalability.

In some aspects, an application can name a task as any free-form string, allowing natural naming without extra storage and a simplified programming model. The named uniqueness can be enforced within a partition within a topic and can be canceled or managed.

Figure 4:
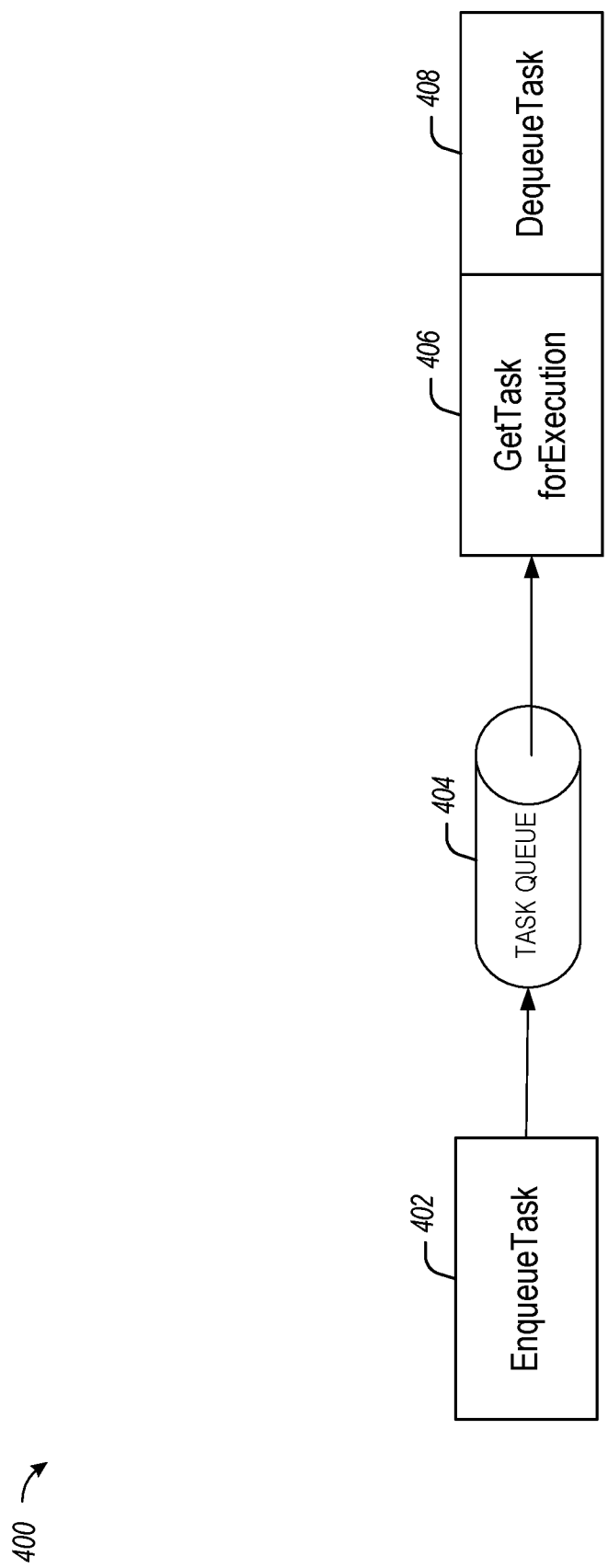
FIG. 4 is a diagram illustrating a queue service by the TQM of FIG. 2 for managing asynchronous tasks, in accordance with some embodiments of the present disclosure.

FIG. 4 is a diagram 400 illustrating queue service by the TQM 128 of FIG. 2 for managing asynchronous tasks, in accordance with some embodiments of the present disclosure. Referring to FIG. 4, TQM 128 can configure a task queuing service including a task queue 404 associated with the functionalities discussed herein. A task producer (e.g., an application or an automatic process) communicates an enqueue task instruction 402 which includes the task. After the task is enqueued in task queue 404 (which can be stored in memory as well as persisted in storage), a worker node can issue a get task instruction 406 (e.g., GetTaskforExecution instruction), which allows the worker node to work on (or otherwise process) the task. After the task is completed, the worker node issues a dequeue task instruction 408, which allows the task queue 404 to be updated (e.g., by the TQM 128) to remove the completed task from the queue.

In some aspects, a lease task instruction can be issued in place of the get task instruction 406. The lease task instruction allows the worker node a pre-configured time to complete the task. If the task is not completed and a dequeue instruction is not issued by the expiration of the pre-configured time, the status of the task is changed back to ready (e.g., the task is again available in the task queue 404 for distribution to another worker node).

In some embodiments, the task queue 404 can be stored using a collection of servers. In some aspects, the task queue 404 can be sharded (e.g., can include multiple partitions), with each partition being mapped to a separate server (the example task queue sharding is illustrated in FIGS. 18-21). In some aspects, the tasks in each shard of the task queue 404 are maintained both in memory as well as persisted (e.g., in a separate storage location such as an internal or external stage). When the TQM 128 adds a task to the queue, the task is persisted both in memory and in storage to facilitate data protection and increase processing efficiency (e.g., faster processing of tasks as a high number of consumers can serve requests faster, and more secure processing as the persisted queue can be used as a recovery log in case of server crashes). Any potential task conflicts can be resolved in memory as it is faster, while the persisted queue remains conflict-free.

In some embodiments, the task queue-related functionalities of the disclosed techniques can include the following idempotency configurations. Since the task queue service of the TQM 128 can be accessed remotely, idempotency can be provided to support retries. In some aspects, idempotency can be provided for all APIs (see some exceptions below) in a uniform way. More specifically, each request can be allowed to specify RequestIdempotencyId (either UUID or string) and the general meaning would be that the service is supposed to respond the same way to all requests with the same RequestIdempotencyId.

For batched APIs, each item in the batch will have its own RequestIdempotencyId. The following additional configurations can be used.

(a) enqueueTask—does nothing and returns the same result as the original enqueue, regardless of what changed with the task so far. If the task was already dequeued, still return a successful enqueue indication, but without re-queueing the task.

(b) getNextTask—return the same task. If the lease is valid and the task is still in the LEASED queue, the lease duration is reset and the same task is returned. Old lease and current lease match can be checked to return a new task. If the task has expired, a new task is returned. If the task has been dequeued, a new task is returned.

(c) dequeueTask—return what the original dequeue returned and do nothing.

(d) dequeueNextTask—return what the original dequeue returned and do nothing.

(e) extendLease—will update the lease duration again (will check that the given old lease matches the previous request and will give out the same new lease, but with updated timing).

(f) enqueueAndGetTask—will try to enqueue a given task and immediately get (lease) this same task. This method is an atomic combination of enqueueTask and getNextTask.

In some embodiments, TQM 128 can configure task queue 404 with the following leases and execution semantics. TQM 128 can configure the task queuing service with two types of leases: strong leases and weak leases. Each lease comes with a time guarantee. The weak versus strong refers to the level at which the queue guarantees that.

The TQM 128 can configure a strong lease, which means that the task given with this lease is guaranteed not to be given to any other consumer (e.g., worker node) as long as the current consumer is alive, under any circumstances (no matter what failures happen in the task queuing service).

The TQM 128 can configure a weak lease, which means that the task will usually/mostly be given to only one consumer, but under some service failure modes might be given to another consumer, even if the lease has not expired yet.

In both cases, if the lease duration has expired (plus some safety margin), the task can be given to another consumer. This assumes correct clients that "respect" the lease—that is, if the lease is about to expire, the client will either resume it or stop task execution. Under that assumption, a strong lease guarantees exactly one execution of a task.

The TQM 128 can configure an infinite lease. In the context of other cloud-based task queues, infinite leases are not supported. This is because they are designed for "open" systems that do not control the clients. They cannot assume clients are correct and cannot know when the client has failed. However, the disclosed task queue functionalities can be configured internally/natively to the network-based database system 102 (e.g., the disclosed task queue functionalities can be designed for internal usage), where the clients are controlled internally and it can be detected when a client fails.

In some aspects, the TQM 128 configures the task queuing service to include the following three possible execution semantics: at most once, at least once, and exactly once. In some aspects, the semantics are defined by the task execution—how many times the Task was executed.

(a) At most once can be achieved by calling dequeueNextTask. Each task can be only successfully dequeued once. Therefore, this call will return the task to only one caller. Since the task is permanently dequeued, it will never be given to anyone else. Thus at most once.

(b) At least once—can be based on getNextTask(weak lease) and dequeue.

(c) Exactly once—can be based on getNextTask(strong lease) and dequeue.

In some embodiments, TQM 128 can configure task queue 404 to include dead letter queue configurations. More specifically, the disclosed task queue functionalities include recording how many times each task is retried for execution. If the task is retried more than X time (configurable, by Topic), it can be placed in a special "dead letter queue." Tasks stay in this queue until manually inspected and returned to the regular queue with AdminSystem$.

In some aspects, TQM 128 can include the following queue management functions. In SQS® and Azure® Queue services, the user has to explicitly create a queue. This is done for two purposes: specifying common attributes and policies that apply to all messages in the queue and for quota/security/access control management.

The TQM 128 can configure task queue 404 without requiring explicit queue creation. This results in a significant benefit to an application developer, since the developer does not need to coordinate queue creation. Every queue "implicitly exists" always and one can enqueue or dequeue from it without any prior initialization. Otherwise, coordinating queue creation could be a burdensome task for some applications (e.g., creating a queue for each new account when the account is provisioned).

In some embodiments, TQM 128 can allow specifying policies on a per-message level. There can be a limited number of policies that affect the queue behavior and thus message policies may not result in a significant overhead. Additionally, no quota or access control management can be provided at the queue level. In some aspects, a set of admin APIs can be provided to manage active queues (e.g., queues that have messages in them), and also allow listing active queues, draining a queue, etc.

FIG. 5, FIG. 6, FIG. 7, FIG. 8, and FIG. 9 illustrate corresponding diagrams 500, 600, 700, 800, and 900 of an application programming interface (API) for accessing task queue services of the TQM of FIG. 2, in accordance with some aspects.

In some aspects, some task queue-related functions can be performed by the API illustrated in FIGS. 5-9 include the following:

(a) Enqueue (to place tasks in the queue), Get (to take a task from the queue so a worker node can work on it), and Dequeue (when a worker completes a task, the worker indicates to the queue that it is done, and the task is dequeued (e.g., removed from the queue permanently)).

(b) Lease. A worker node gets a lease on a task to work on for a pre-determined period.

(c) Extend a lease. A current lease on a task can be extended.

Figure 10:
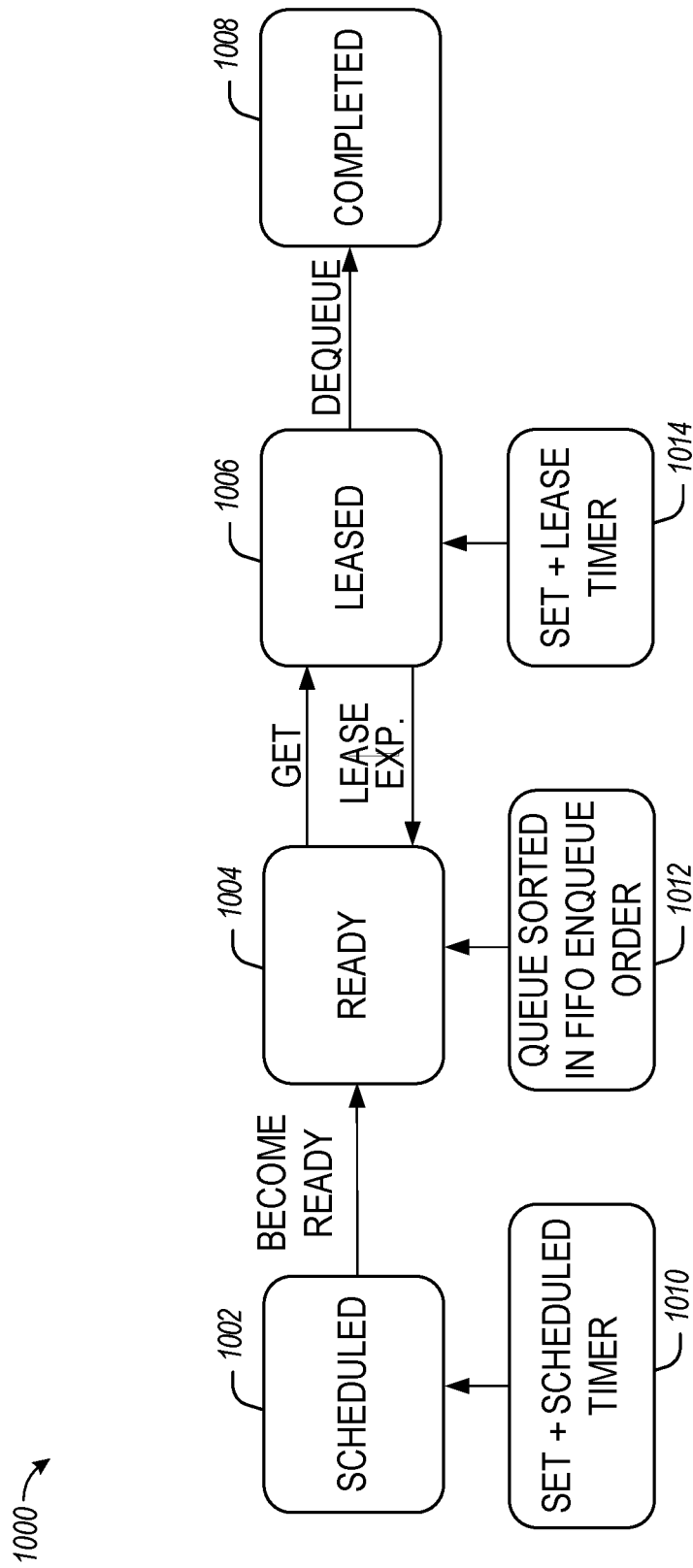
FIG. 10 is a diagram illustrating the life of a task in a task queue managed by the TQM of FIG. 2, in accordance with some aspects.

FIG. 10 is a diagram 1000 illustrating the life of a task in a task queue managed by the TQM of FIG. 2, in accordance with some aspects. Referring to FIG. 10, a new task can be designated with scheduled state 1002, which can include setting up a scheduled timer 1010. After the scheduled timer 1010 expires, the task becomes ready for processing in the task queue 404 and is assigned a ready state 1004. In some aspects, a sorting operation 1012 is performed where the task queue 404 is sorted in a FIFO enqueue order (or the task queue is configured so that all new tasks are automatically entered based on a FIFO enqueue order).

In some aspects, the TQM 128 receives a get or lease instruction resulting in a leased state 1006 being assigned to the task. Once the task is leased to the requesting worker node, a lease timer 1014 is started which sets the duration of a period for completion of the task. If the lease timer 1014 expires before the completion of the task, the task is assigned back to the ready state 1004. If the task is completed before the expiration of the lease timer 1014, a dequeue instruction is issued by the worker node, and the task state is changed to a completed state 1008 (at which time the task is removed from task queue 404).

Figure 11:
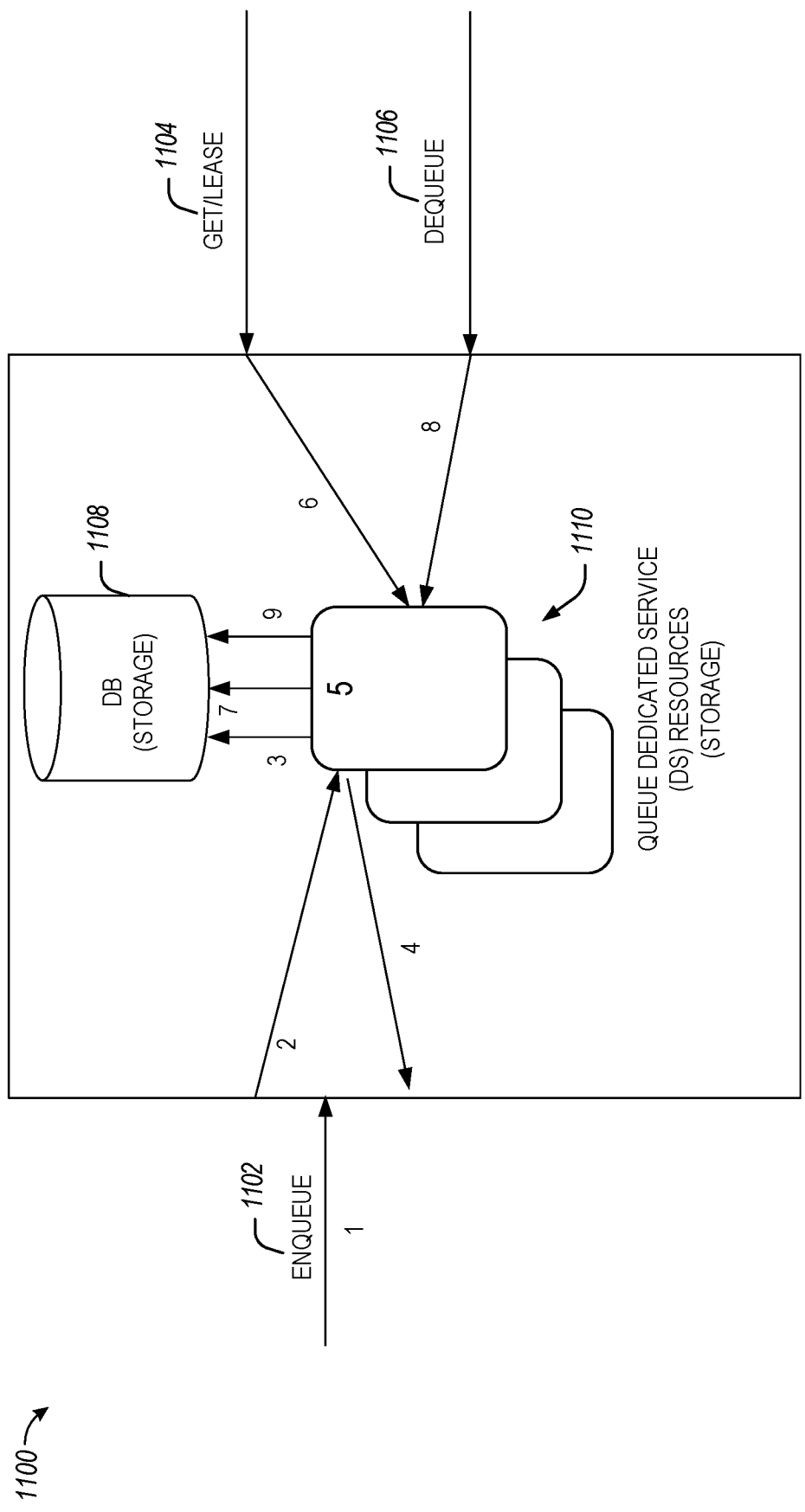
FIG. 11 is a more detailed diagram of the TQM of FIG. 2, in accordance with some aspects.

FIG. 11 is a more detailed diagram 1100 of the TQM of FIG. 2, in accordance with some aspects. Referring to FIG. 11, the TQM 128 can configure the task queue 404 using dedicated service (DS) resources 1110 (e.g., one or more resources for in-memory storage of the task queue) and other persistent storage resources such as database 1108. The task queue-related functions associated with an enqueue request 1102, a get/lease instruction 1104, and a dequeue instruction 1106 are illustrated by operations 1-9 in FIG. 11.

At operation 1, a client node (e.g., a task-producing node or application) sends an enqueue request 1102, which includes the task for enqueuing.

At operation 2, the task is queued in the DS resource 1110.

At operation 3, the task is also journaled in database 1108 (e.g., the task is persisted in database 1108).

At operation 4, an acknowledgment of the task enqueuing is returned to the client node.

At operation 5, the task queue is maintained as an in-memory queue at the DS resource 1110. When task time arrives, the task is made available for leasing in memory.

At operation 6, a worker node asks for more work (e.g., a new task from the queue to work on) by communicating a get (or lease) instruction 1104.

At operation 7, the worker node has asked "exactly once", and the lease state of the task persisted in database 1108 is updated. If the node has asked for the task "at least once", then no state update in database 1108 is performed. The task is then returned to the worker node for processing.

At operation 8, the worker node completes the task and communicates a dequeue instruction 1106. The task is then dequeued from the in-memory task list maintained at the DS resource 1110.

At operation 9, a dequeuing update is also performed in the corresponding persisted task queue in database 1108. In some aspects, the dequeuing update of operation 9 can be performed in bulk.

In some aspects, TQM 128 can configure operations 3 and 9 to be batched (e.g., by potentially increasing client request latency but optimizing access to database 1108.

In some aspects, TQM 128 can configure operation 7 to be batched as well (e.g., by using a "Group Lease"). In some aspects, the batch-related settings could vary based on queue quality of service (QoS) configurations.

In some aspects, TQM 128 can configure the task queuing service based on the following configurations associated with the DS resource 1110:
 (a) The enqueue request 1102 (e.g., EndueenqueueTask) is communicated to a DS resource for that queue (e.g., DS resource 1110).
 (b) A newly received task is queued in memory and journaled (or persisted) in a database.
 (c) Multiple task-related requests can be batched in memory until journaled and responded to (both for enqueue and dequeue instructions).
 (d) Maintains in-memory time-based queue, with no database polling used by a worker node to find tasks to work on.
 (e) When a task is ready, the task is marked as dispatched and ready to be "peeked/leased".
 (f) When a client node indicates the task is done, the task is dequeued and removed from the queue.
 (g) Persistent journaling in database 1108 is performed for fault tolerance (or spill under memory pressure).

In some aspects, the task queue configured by TQM 128 can include the following features: task queue can reclaim leases (e.g., after expiration of a lease timer and the task not being completed), state persistence, state recovery, long poll, and sharding.

Additionally, the DS-based task queue service configured by the TQM 128 can include the following features:
 (a) the DS resource 1110 can be configured as a microservice framework.
 (b) the DS resource 1110 stores the service state (resource) in memory.
 (c) The TQM 128 can configure each task queue as a resource hosted by a DS node.
 (d) The DS resource 1110 manages resource ownership.
 (d.1) In some aspects, the DS resource 1110 uses a lease-based ownership protocol. A routing table can be stored in a database and cached separately.
 (d.2) The DS node might lose ownership in the middle of request processing. Only the queue owner can change the queue state. The queue can check in the database 1108 and confirm which entity is the task owner and can ask the client to retry accordingly.
 (e) Request routing based on the DS resource 1110.
 (e.1) The first request will be sent to a random node, which will claim the ownership of the resource.
 (e.2) Following requests will be routed to the resource owner node.

In some embodiments, TQM 128 configures the disclosed task queue service using the following queue state persistence configurations and design principles.
 (a) The task queue state is saved in database 1108 to not lose data if the DS server fails.
 (b) Use the storage only for data reliability/durability. All complex queue state management and business logic are powered by the in-memory DS state. In some aspects, TQM 128 uses a database persistent state as a backup, to flush the in-memory state and be able to recover it after the DS node failure. This means the storage usage is optimized for simple interactions that only need to support backup/restore functionalities. Multiple slices with a wide range of indices are not needed as those are not required for recovery (this feature increases the task queue service efficiency).
 (c) Blind writes can be configured. The task queue can rely on DS resource strong ownership guarantee and do only blind writes into database 1108.
 (d) Task as a State machine. Each task will have a state field and nextTransitionTime field. Each task is present in one state and can be stored in the primary slice. The task queue can use the state and nextTransitionTime fields as part of the primary slice key. In this regard, updating the task means deleting the old task and re-inserting the new slice.
 (e) Minimize Slices. Numerous slices can be avoided to simplify code. Therefore, TQM 128 can maintain only two slices: a primary slice and one extra index slice to power recovery. That index will power all the recovery read scenarios that are needed. In some aspects, TQM 128 can further optimize the slices, eliminating the primary slice and leaving only 1 slice to power recovery.

In some embodiments, TQM 128 can be configured with the following functionalities associated with reclaiming leases. A lease can be for an extended duration. In cases of application crashes, leases of the failed nodes can be reclaimed. TQM 128 can detect a worker node crash, it can broadcast a request to all the queues, and ask them to reclaim leases of the failed worker node.

FIG. 12, FIG. 13, and FIG. 14 illustrate example data persistence objects (DPOs) of abstractions that define how metadata objects are stored in a database in connection with the configuration of task queue by a TQM, in accordance with some aspects. For example, FIG. 12 illustrates a diagram 1200 of configurations for a DPO primary slice, FIG. 13 illustrates a diagram 1300 of configurations for a DPO dynamic data slice, and FIG. 14 illustrates a diagram 1400 of configurations for a DPO static data slice.

In some aspects, database persistence for database 1108 can be configured with the following slice functionalities and configurations:

(a) AsyncTaskDPO Primary Slice: queueTopic, queueId, taskName.
(b) Transitions slice: queueTopic, queueId, taskState, nextTransitionTime, taskName.
(c) Completed slice: queueTopic, queueId, completedTime, taskId, UUID.
(d) Extra fields: TaskData, State, leasingGSID, leasingGSIncarnationId, receive count, UUID CompletedTime
(e) The following operations can be configured for database persistence:
(e.1) Enqueue: insert a new task in the scheduled or ready state with updated nextTransitionTime.
(e.2) Get: delete the old task, insert new task with updated state, and nextTransitionTime set to lease expiration.
(e.3) Dequeue: delete the old task, and insert the new task in the completed state (OR if the lease expired insert it back in the ready state).
(e.4) Upon Lease expiration (triggered by the DS timer): delete the old tasks and insert new ones in the ready state.
(e.5) Extend Lease: delete old task, insert new task with updated nextTransitionTime.
(f) Recovery.
(f.1) Rebuild in-memory state upon recovery or ownership change.
(f.2) efficiently read from database 1108 what should have been in memory: all tasks in the SCHEDULED, READY, and LEASED states.
(g) Spill of.
(g.1) Spill from memory to database 1108 upon memory pressure, based on nextTransitionTime.
(g.2) Spill tasks in the SCHEDULED queue whose scheduled time is now+delta, discard from memory, and remember to read back when the time arrives.
(g.3) Spill the tail of the READY queue and remember to read back when the queue is close to being empty.
(g.4) Never spill LEASED queue. If the queue is spilled, then need to read back from FDB on demand upon dequeuing.

In some embodiments, database 1108 can be configured with the following idempotency configurations.

(a) Observation: No need to store explicitly, can recover from other states.
(b) A per-task operations log can be maintained.
(b.1) TQM 128 can record with each task the idempotency IDs of all operations on a Task+operation type.
(b.2) the following three logs can be maintained: enqueue, lease, and dequeue.
(b.3) Each time the task state is updated in database 1108, the new operation ID that did that operation is appended.
(b.4) Upon recovery, the in-memory idempotency maps can be reconstructed (e.g., by scanning enough in the past of each state). In this regard, no additional slices are needed for idempotency.

In some embodiments, TQM 128 can be configured for optimized polling based on the following configurations.

(a) Step 1: switch to async API.
(b) Step 2: long poll RPC—getNext(queueID) will block up to X seconds of waiting for any ready messages. A logical block, not a thread block can be considered.
(c) Step 3: multi-queue poll—one long poll RPC can be used to wait for any of the given queues on the DS server. In some aspects, fairness can be supported. That makes the overhead of polling—in terms of RPCs and blocked threads—to a minimum.
(d) Step 4: decouple polling from execution. Prefetch X tasks from different or the same queue, store them in the per-queue/per-topic/heterogeneous queue and execute tasks from the queue. These functionalities can also be used in connection with a compactor function.

Figure 15:
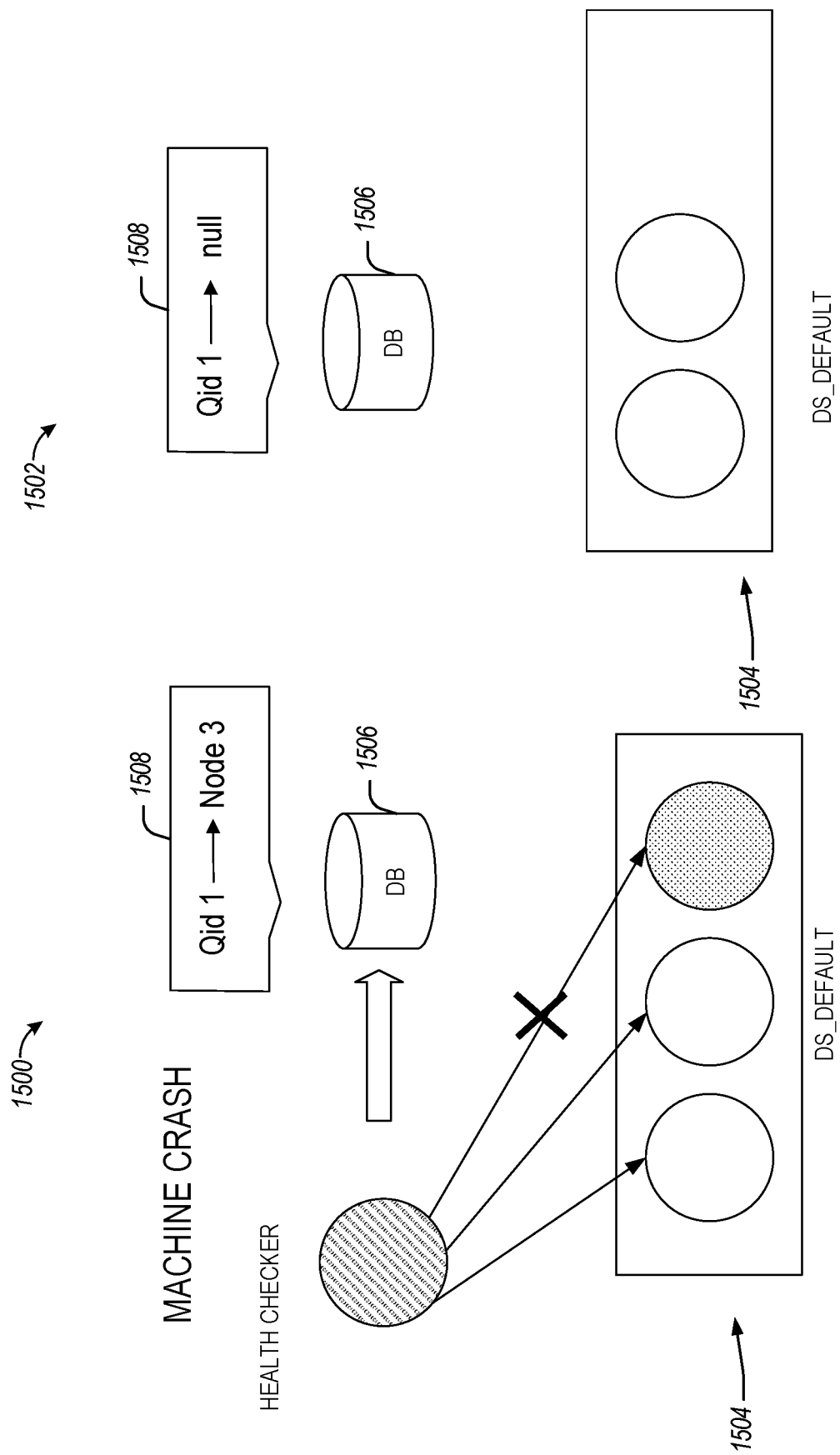
FIG. 15, FIG. 16, and FIG. 17 illustrate example task state recovery using resource management functionalities of a TQM, in accordance with some aspects.
Figure 16:
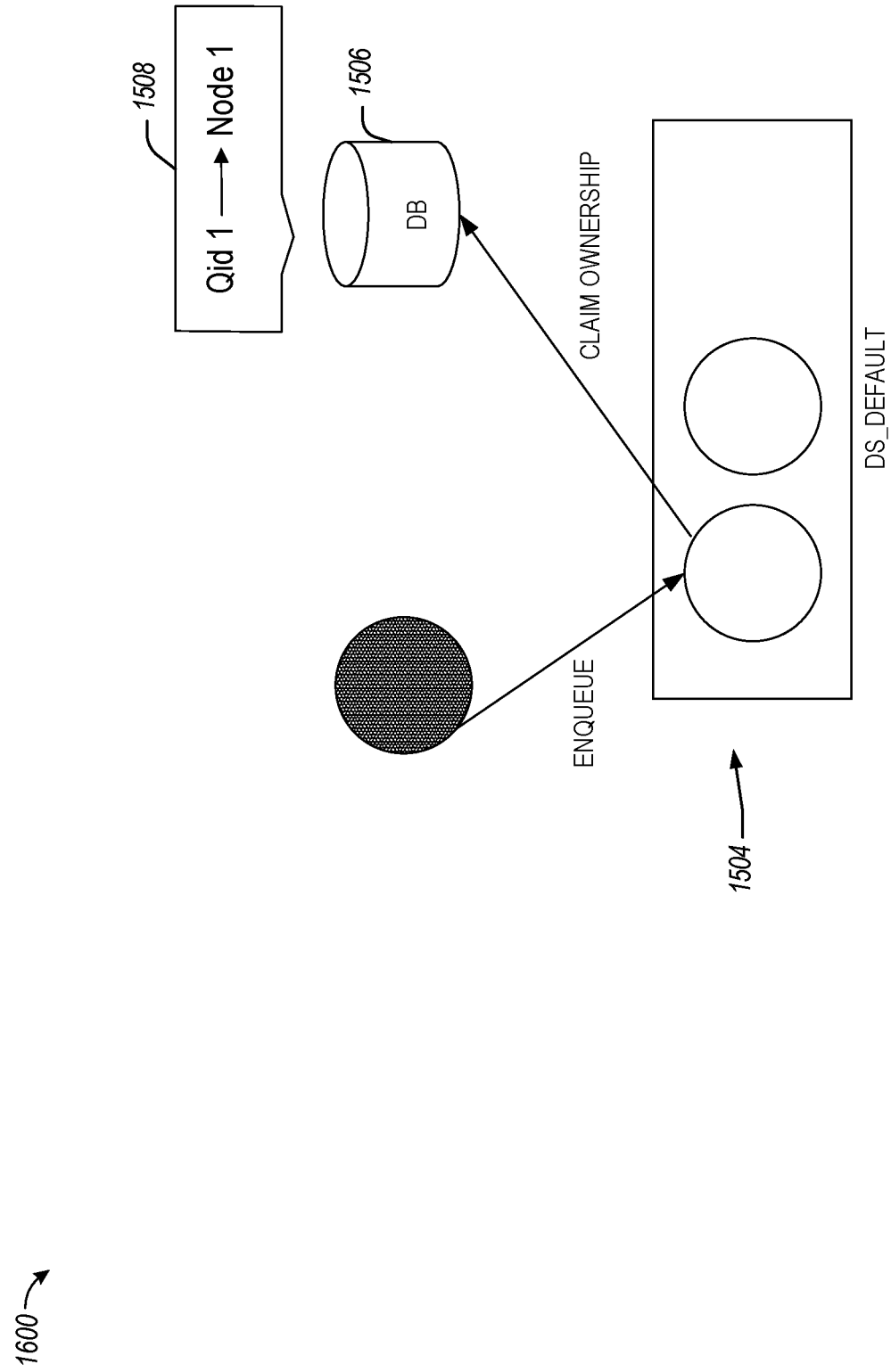
Figure 17:
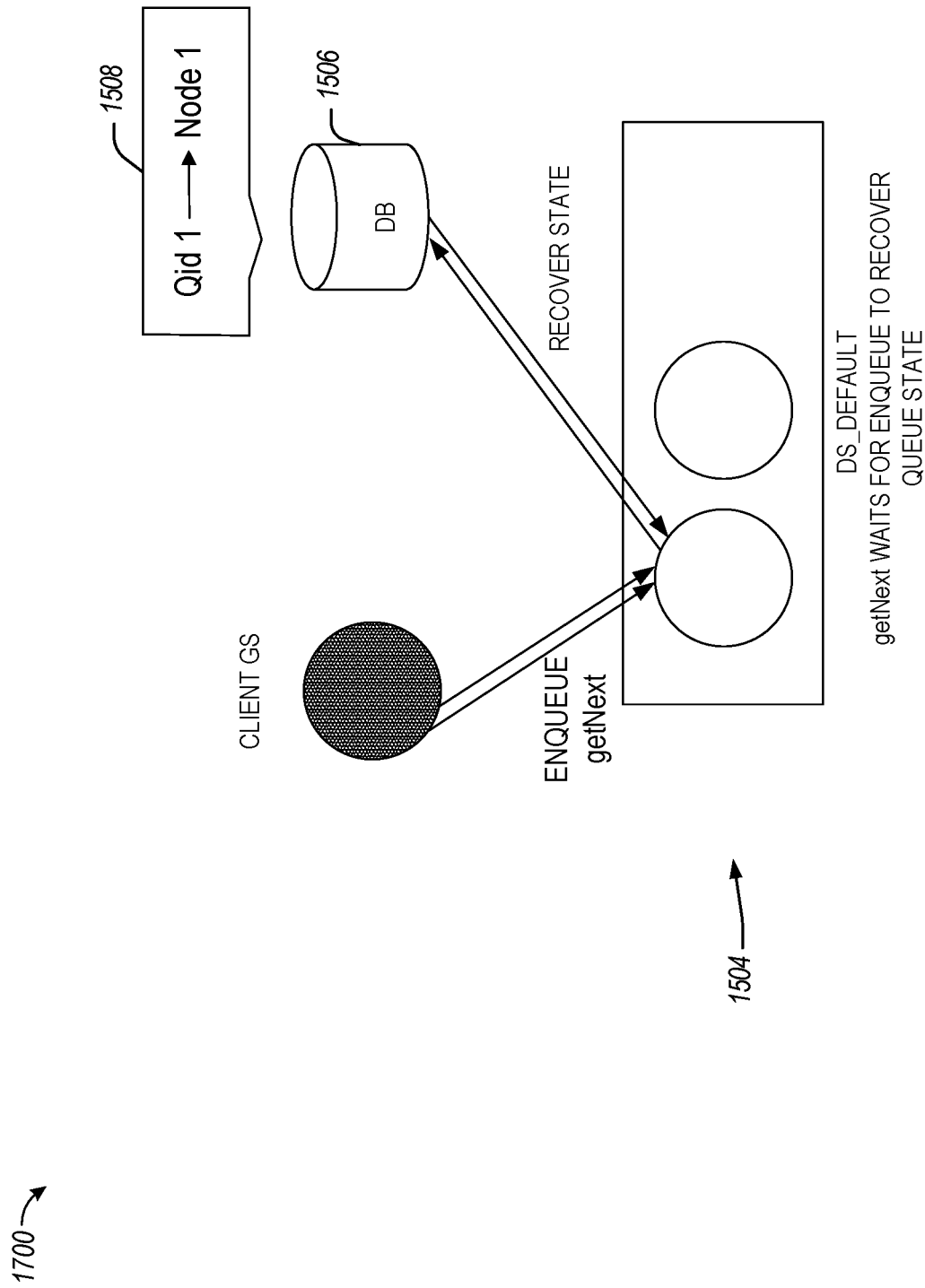

FIG. 15, FIG. 16, and FIG. 17 illustrate example task state recovery using DS resource management functionalities of a TQM, in accordance with some aspects. More specifically, diagrams 1500, 1502, 1600, and 1700 illustrate sequential processing for task state recovery based on a machine/node crash hosting task queue 1504 in memory and database 1506 persisting the task queue and also maintaining a queue identifier record 1508 (e.g., with a task queue ID and a node identifier for the node used for in-memory storage of the queue).

In some aspects, the state recovery based on DS resource management can be performed using the following sequential operations illustrated by diagrams 1500, 1502, 1600, and 1700 (in FIGS. 15-17).

Initially, a health checker can detect a DS node failure using heartbeat functionalities. Resource routing can be performed where a new DS node request is routed to a random DS node, which becomes the new owner. The corresponding queue identifier record 1508 can be updated accordingly. Subsequently, the queue is recovered/initialized when the first request arrives (the queue has not been initialized or has been cleared).

In some embodiments, TQM 128 can be configured to perform state recovery by using recovery for state transfer. Such processing can be used for resource rebalance system function and DS node graceful shutdown. Processing for state recovery can further include recovering the queue on a new resource owner when the first request arrives. Additionally, for Node A→Node B, Node B→Node A processing, Node A needs to know the state transfer happens and reinitializes the state. DS state manager callbacks can be used to clear the old queue (e.g., using clearState() to clear the queue on the previous owner).

Figure 18:
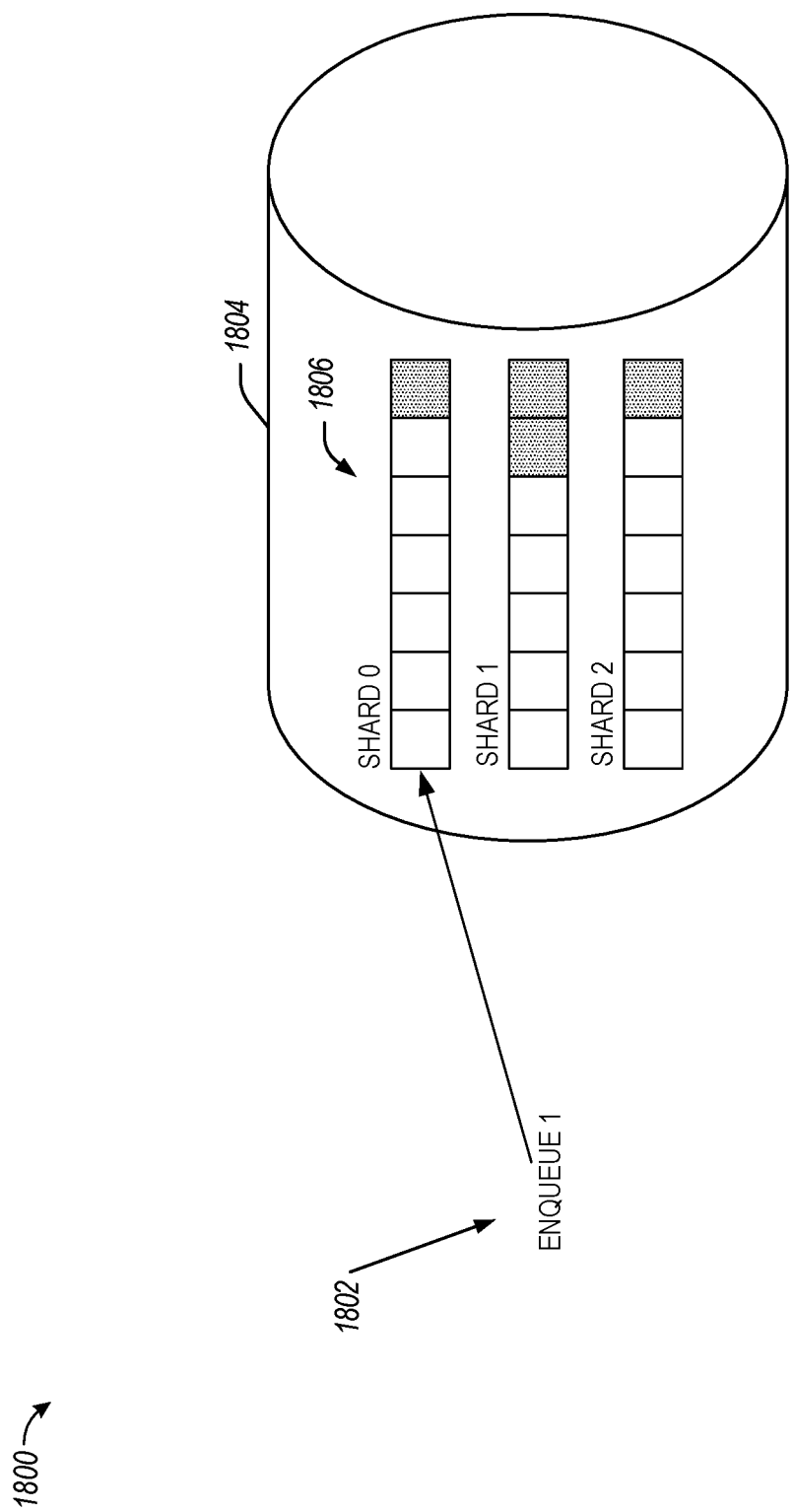
FIG. 18 and FIG. 19 illustrate enqueuing tasks in a sharded task queue managed by a TQM, in accordance with some aspects.
Figure 19:
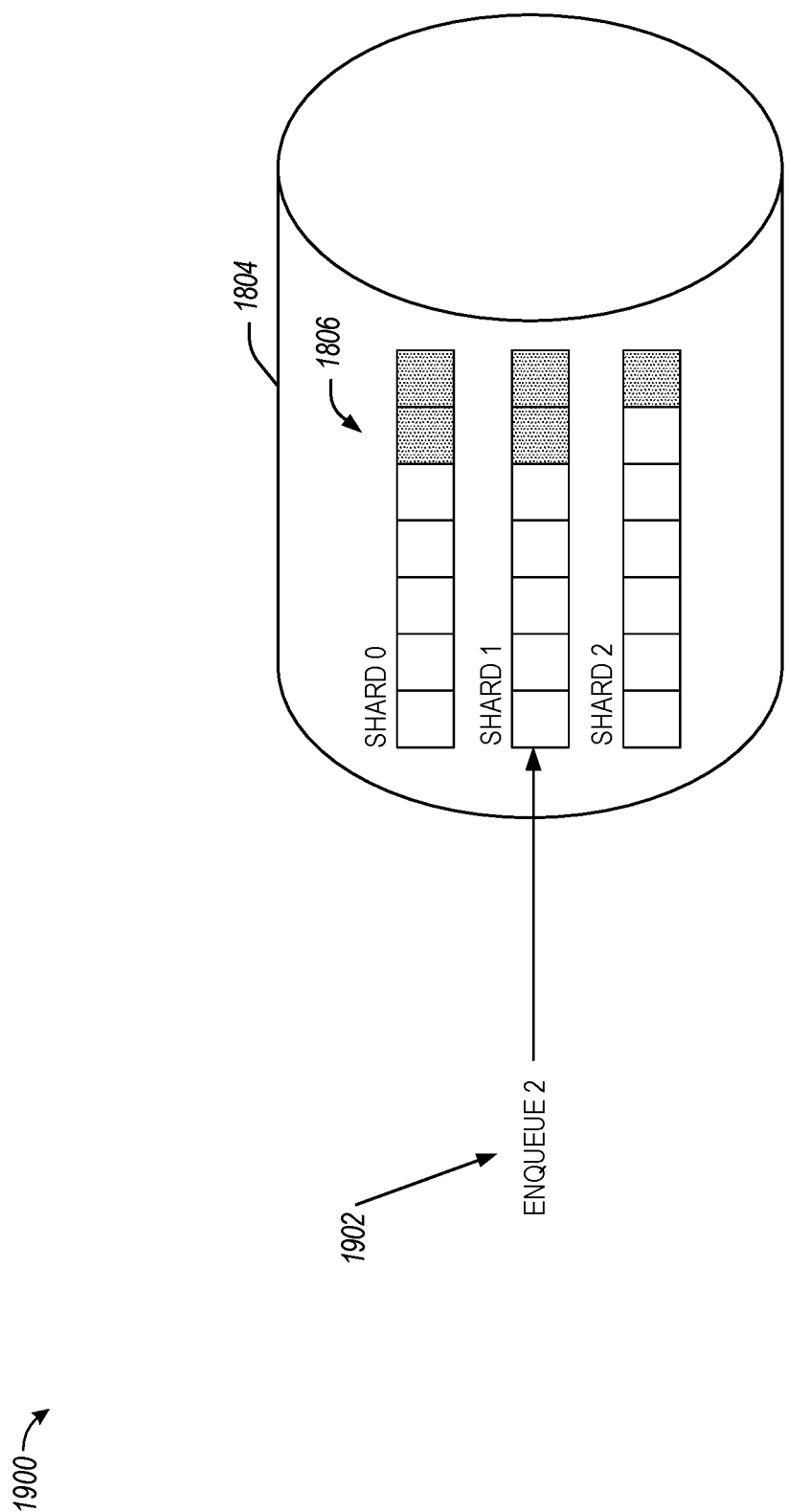

FIG. 18 and FIG. 19 illustrate corresponding diagrams 1800 and 1900 of enqueuing tasks in a sharded task queue managed by a TQM, in accordance with some aspects. Referring to FIG. 18 and FIG. 19, task queue 1804 can be sharded (e.g., partitioned) into a plurality of shards 1806. Incoming enqueue requests 1802 and 1902 can be enqueued in corresponding shards of the plurality of shards 1806.

In some aspects, sharding of the queue can be used to address the issue of a bottleneck on the global lock after enabling persistence. In some aspects, a global lock can be used to protect the in-memory state and all requests are processed in serial. In some aspects, database transactions under the global lock dominate the latency.

In some aspects, the enqueuing into different shards can be based on a round-robin scheme.

Figure 20:
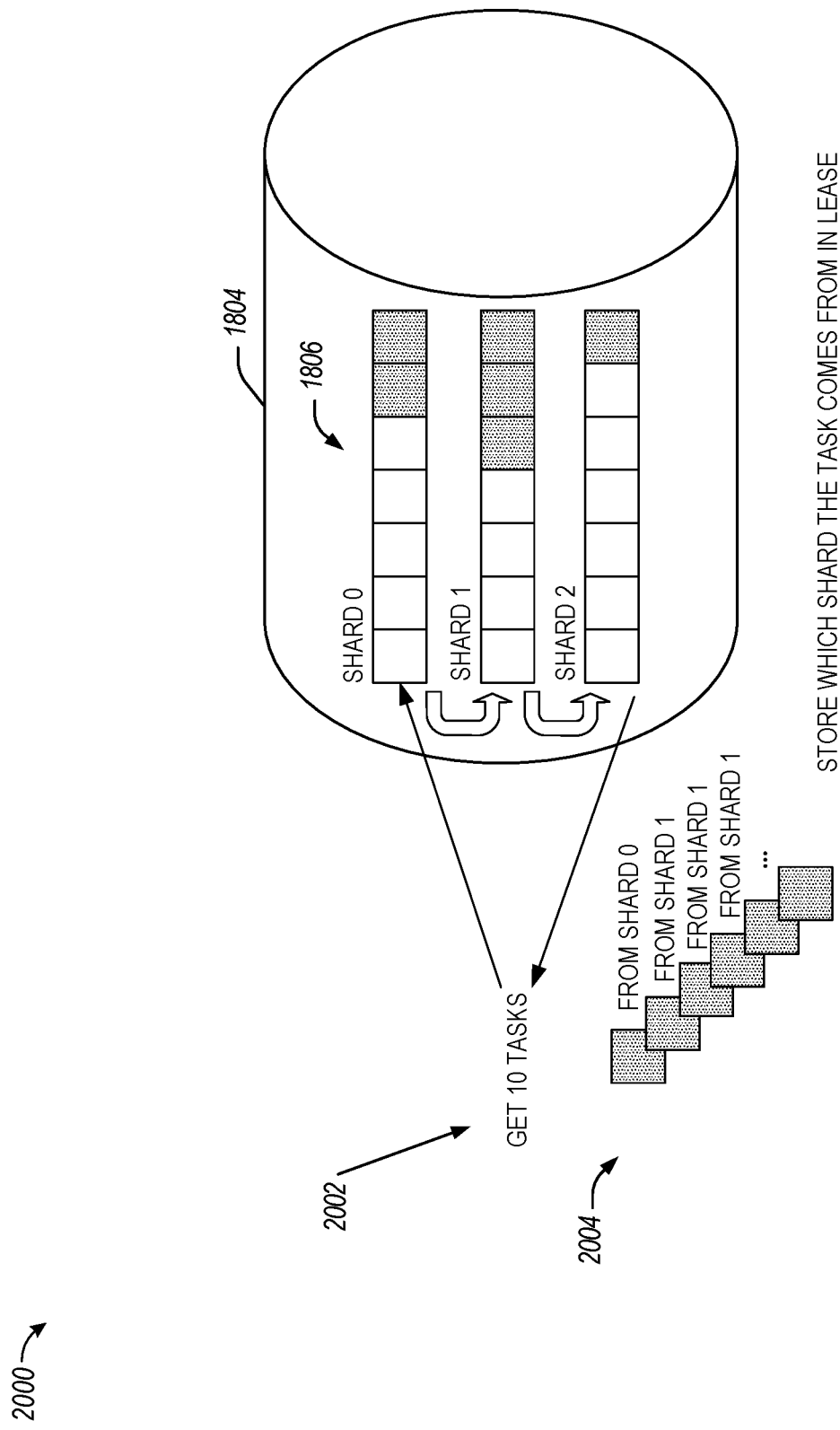
FIG. 20 and FIG. 21 illustrate obtaining and dequeuing tasks from a sharded task queue managed by a TQM, in accordance with some aspects.
Figure 21:
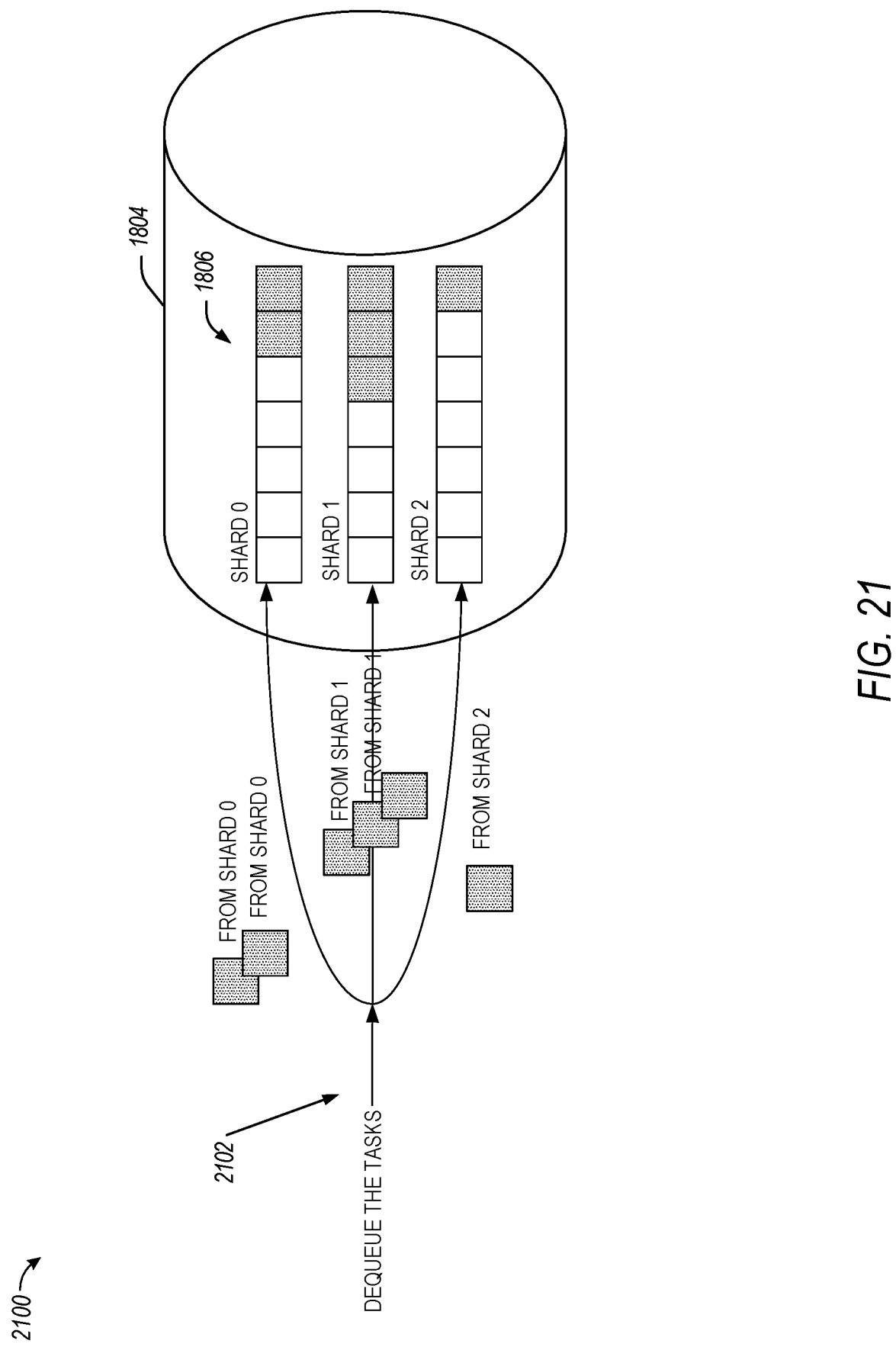

FIG. 20 and FIG. 21 illustrate obtaining and dequeuing tasks from a sharded task queue managed by a TQM, in accordance with some aspects. Referring to FIG. 20, diagram 2000 illustrates a task queue processing scenario where instruction 2002 is received which can include a get instruction for multiple tasks. In this case, a GetNext instruction can be performed so that the plurality of shards 1806 are sensed (or walked through) and tasks are obtained at operation 2004 from multiple shards until enough tasks are located to satisfy instruction 2002 (e.g., one task can be obtained per shard on each pass through the plurality of shards).

Referring to FIG. 21, diagram 2100 illustrates a task queue processing scenario where instruction 2102 is received which can include an instruction for dequeuing multiple tasks. TQM 128 can determine which shards the dequeue instruction is associated with, and the tasks are dequeued from such shards.

Figure 22:
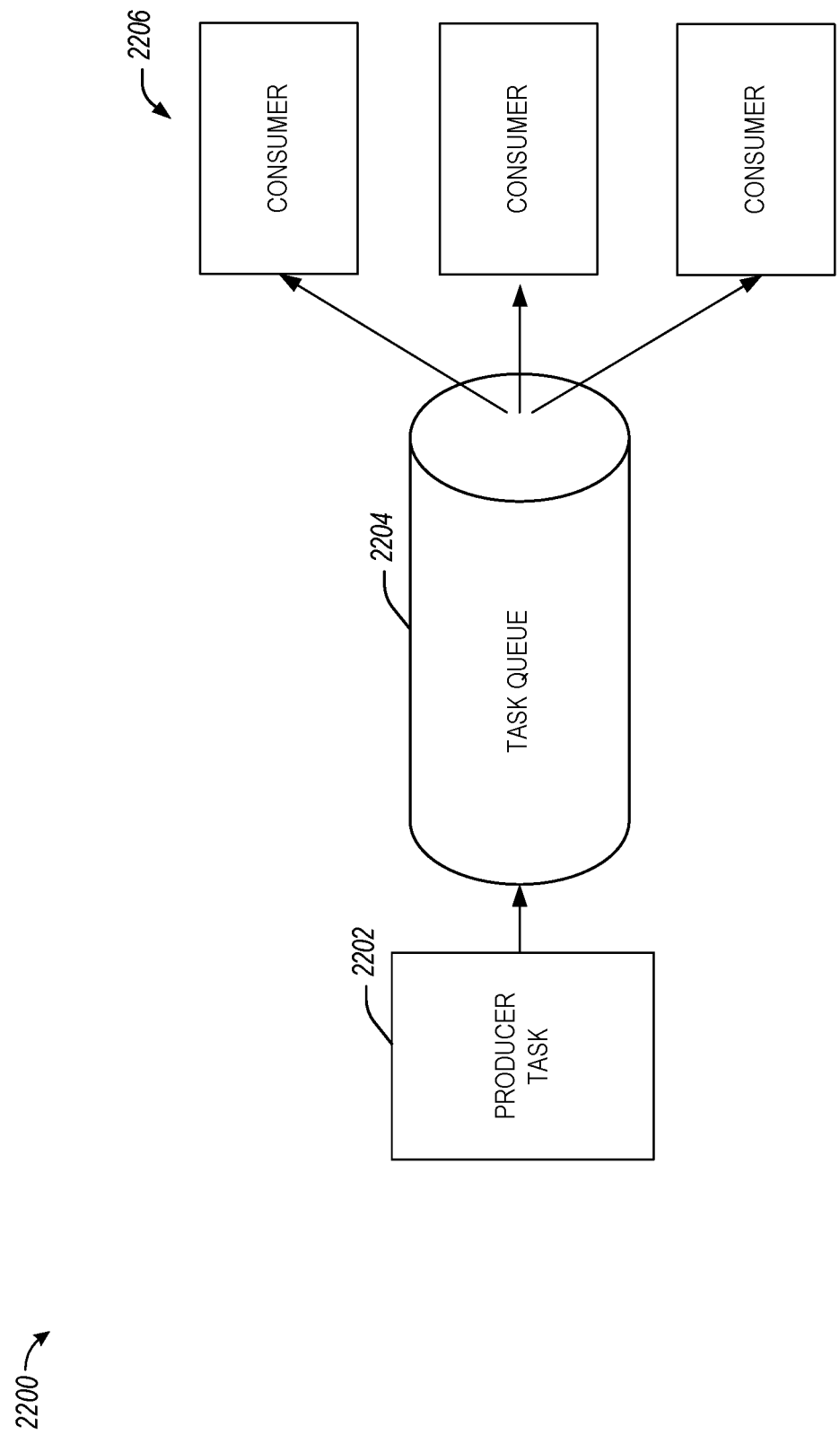
FIG. 22 is a diagram of example task queue compaction which can be configured by a TQM, in accordance with some aspects.

FIG. 22 is a diagram 2200 of example task queue compaction which can be configured by a TQM, in accordance with some aspects. Referring to FIG. 22, compaction can be performed in a task queue system including a task producer 2202, a task queue 2204, and task consumers 2206.

In some embodiments, a compactor can be configured and scaled by adding threads and using an account lock (however; such a compactor may not keep up with large data sets).

In some aspects, a compactor can be configured with a task queue. More specifically, a task queue can be configured per node cluster, where a set of shared worker nodes can pull from the queue. Different queues can be scaled separately.

In some aspects, a task queue can be configured per DS resource node cluster. In some aspects, a set of shared workers can pull from the queue, where worker nodes can be located anywhere, up to X parallel tasks per queue can be configured, and different queues can be scaled separately.

Figure 23:
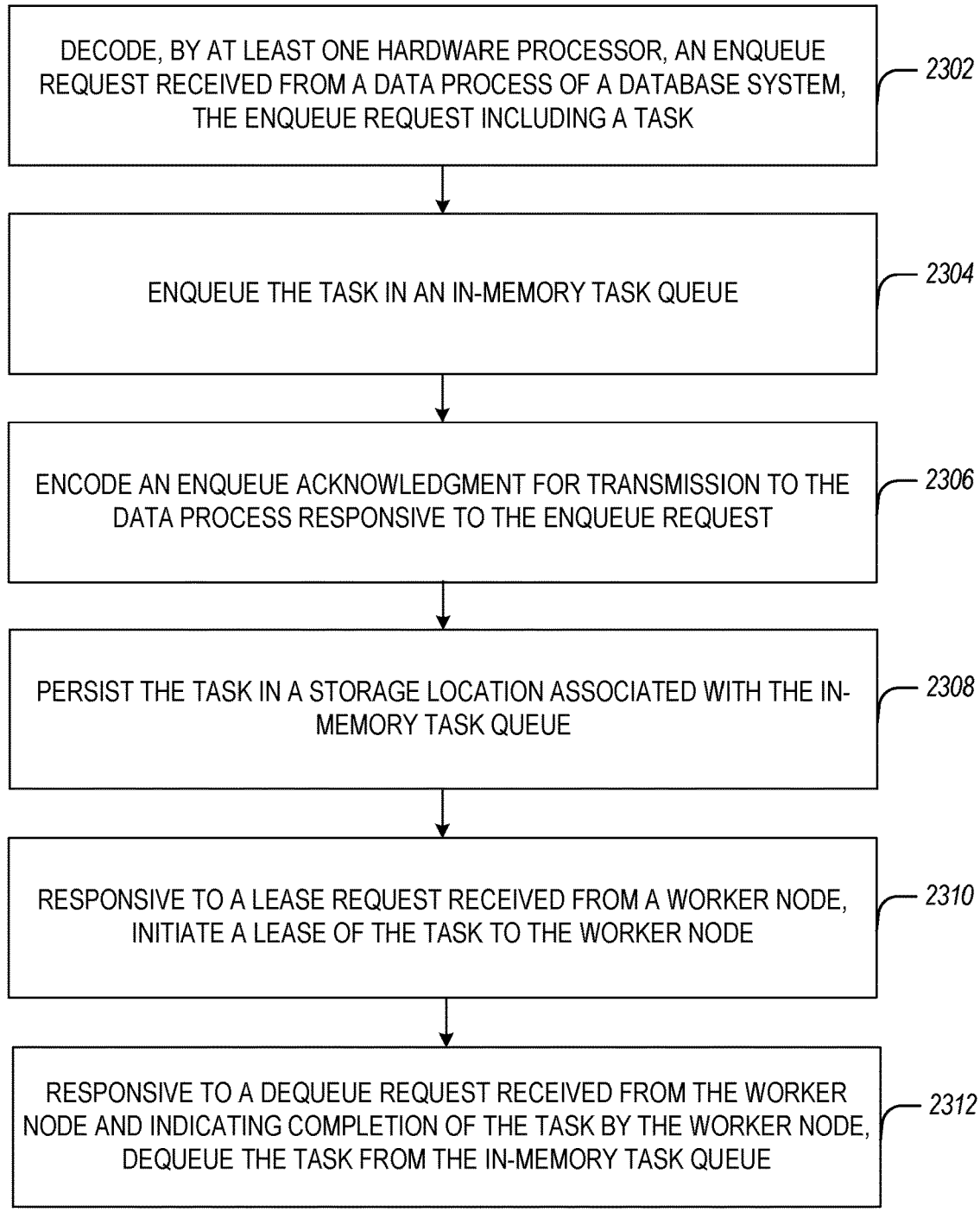
FIG. 23 is a flow diagram illustrating the operations of a database system in performing a method for processing tasks stored in a task queue managed by a task queue manager, in accordance with some embodiments of the present disclosure.

FIG. 23 is a flow diagram illustrating the operations of a database system in performing method 2300 for processing tasks stored in a task queue managed by a task queue manager, in accordance with some embodiments of the present disclosure. Method 2300 may be embodied in computer-readable instructions for execution by one or more hardware components (e.g., one or more processors) such that the operations of method 2300 may be performed by components of network-based database system 102, such as components of the compute service manager 108 (e.g., the TQM 128) and/or the execution platform 110 (which components may be implemented as machine 2400 of FIG. 24). Accordingly, method 2300 is described below, by way of example with reference thereto. However, it shall be appreciated that method 2300 may be deployed on various other hardware configurations and is not intended to be limited to deployment within the network-based database system 102.

At operation 2302, an enqueue request received from a data process of a database system is decoded. The enqueue request includes a task.

At operation 2304, the task is enqueued in an in-memory task queue.

At operation 2306, an enqueue acknowledgment is encoded for transmission to the data process responsive to the enqueue request.

At operation 2308, the task is persisted in a storage location associated with the in-memory task queue.

At operation 2310, responsive to a lease request received from a worker node, a lease of the task is initiated to the worker node.

At operation 2312, responsive to a dequeue request received from the worker node and indicating completion of the task by the worker node, the task is dequeued from the in-memory task queue.

In some embodiments, operations 2306 and 2308 can be reversed. For example, the task is first persisted in a storage location associated with the in-memory task queue, and then an enqueue acknowledgment is encoded for transmission to the data process responsive to the enqueue request.

Figure 24:
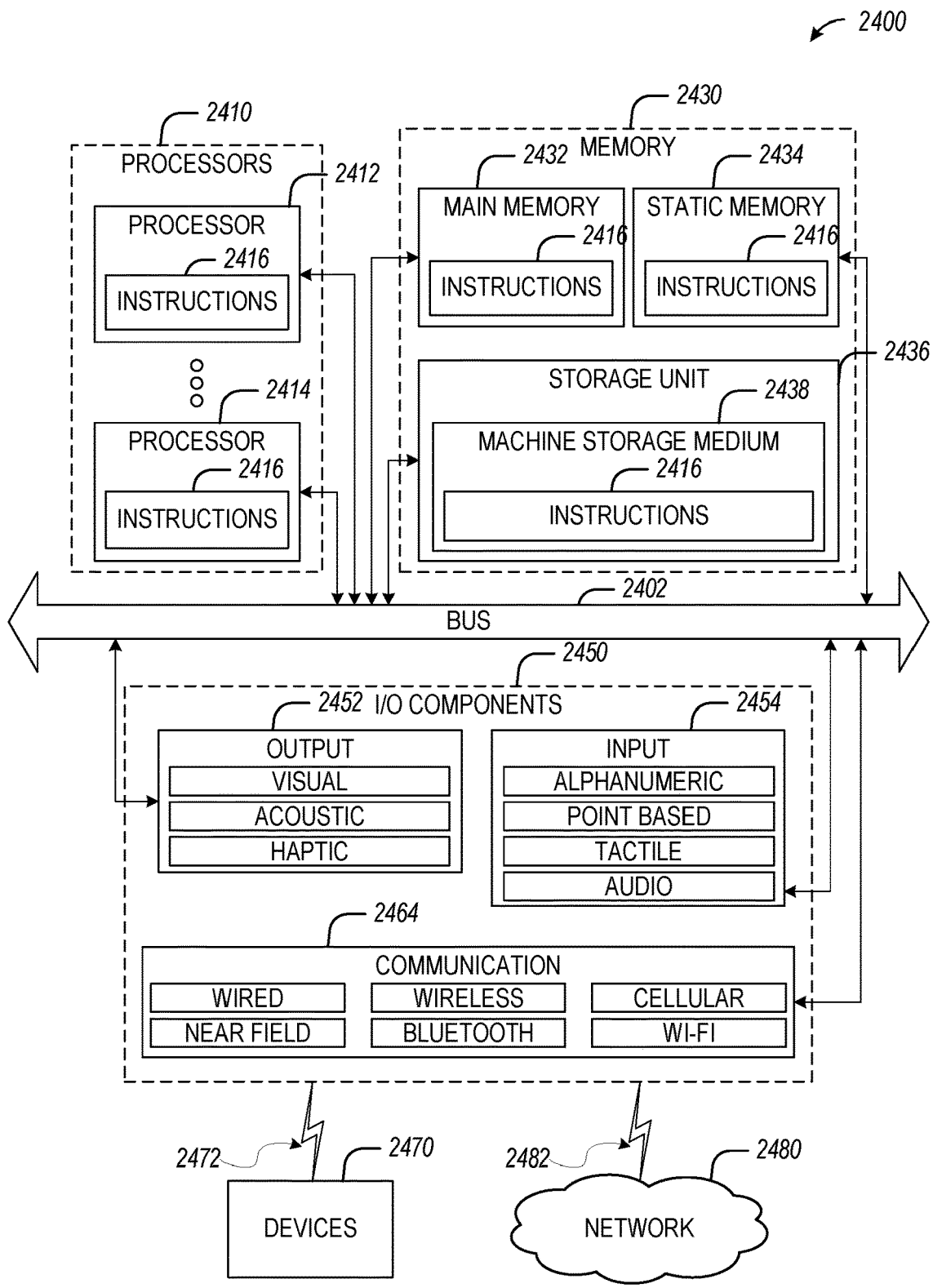
FIG. 24 illustrates a diagrammatic representation of a machine in the form of a computer system within which a set of instructions may be executed for causing the machine to perform any one or more of the methodologies discussed herein, in accordance with some embodiments of the present disclosure.

FIG. 24 illustrates a diagrammatic representation of machine 2400 in the form of a computer system within which a set of instructions may be executed for causing machine 2400 to perform any one or more of the methodologies discussed herein, according to an example embodiment. Specifically, FIG. 24 shows a diagrammatic representation of machine 2400 in the example form of a computer system, within which instructions 2416 (e.g., software, a program, an application, an applet, an app, or other executable code) for causing the machine 2400 to perform any one or more of the methodologies discussed herein may be executed. For example, instructions 2416 may cause machine 2400 to execute any one or more operations of method 2300 (or any other technique discussed herein, for example in connection with FIG. 4-FIG. 23). As another example, instructions 2416 may cause machine 2400 to implement one or more portions of the functionalities discussed herein. In this way, instructions 2416 may transform a general, non-programmed machine into a particular machine 2400 (e.g., the compute service manager 108 or a node in the execution platform 110) that is specially configured to carry out any one of the described and illustrated functions in the manner described herein. In yet another embodiment, instructions 2416 may configure the compute service manager 108 and/or a node in the execution platform 110 to carry out any one of the described and illustrated functions in the manner described herein.

In alternative embodiments, machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. Machine 2400 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

Machine 2400 includes processors 2410, memory 2430, and input/output (I/O) components 2450 configured to communicate with each other such as via a bus 2402. In some example embodiments, the processors 2410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2412 and a processor 2414 that may execute the instructions 2416. The term "processor" is intended to include multi-core processors 2410 that may comprise two or more independent processors (sometimes referred to as "cores") that may execute instructions 2416 contemporaneously. Although FIG. 24 shows multiple processors 2410, machine 2400 may include a single processor with a single core, a single processor with multiple cores (e.g., a multi-core processor), multiple processors with a single core, multiple processors with multiple cores, or any combination thereof.

The memory 2430 may include a main memory 2432, a static memory 2434, and a storage unit 2436, all accessible to the processors 2410 such as via the bus 2402. The main memory 2432, the static memory 2434, and the storage unit 2436 stores the instructions 2416 embodying any one or more of the methodologies or functions described herein. The instructions 2416 may also reside, completely or partially, within the main memory 2432, within the static memory 2434, within machine storage medium 2438 of the storage unit 2436, within at least one of the processors 2410 (e.g., within the processor's cache memory), or any suitable combination thereof, during execution thereof by the machine 2400.

The I/O components 2450 include components to receive input, provide output, produce output, transmit information, exchange information, capture measurements, and so on. The specific I/O components 2450 that are included in a particular machine 2400 will depend on the type of machine. For example, portable machines such as mobile phones will likely include a touch input device or other such input mechanisms, while a headless server machine will likely not include such a touch input device. It will be appreciated that the I/O components 2450 may include many other components that are not shown in FIG. 24. The I/O components 2450 are grouped according to functionality merely for simplifying the following discussion and the grouping is in no way limiting. In various example embodiments, the I/O components 2450 may include output components 2452 and input components 2454. The output components 2452 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2450 may include communication components 2464 operable to couple the machine 2400 to a network 2480 or devices 2470 via a coupling 2482 and a coupling 2472, respectively. For example, communication components 2464 may include a network interface component or another suitable device to interface with network 2480. In further examples, communication components 2464 may include wired communication components, wireless communication components, cellular communication components, and other communication components to provide communication via other modalities. The device 2470 may be another machine or any of a wide variety of peripheral devices (e.g., a peripheral device coupled via a universal serial bus (USB)). For example, as noted above, machine 2400 may correspond to any one of the compute service manager 108 or the execution platform 110, and device 2470 may include the client device 114 or any other computing device described herein as being in communication with the network-based database system 102 or the storage platform 104.

The various memories (e.g., 2430, 2432, 2434, and/or memory of the processor(s) 2410 and/or the storage unit 2436) may store one or more sets of instructions 2416 and data structures (e.g., software) embodying or utilized by any one or more of the methodologies or functions described herein. These instructions 2416, when executed by the processor(s) 2410, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2480 or a portion of network 2480 may include a wireless or cellular network and coupling 2482 may be a Code Division Multiple Access (CDMA) connection, a Global System for Mobile Communications (GSM) connection, or another type of cellular or wireless coupling. In this example, the coupling 2482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE)

standard, others defined by various standard-setting organizations, other long-range protocols, or other data transfer technology.

The instructions 2416 may be transmitted or received over network 2480 using a transmission medium via a network interface device (e.g., a network interface component included in the communication components 2464) and utilizing any one of several well-known transfer protocols (e.g., hypertext transfer protocol (HTTP)). Similarly, instructions 2416 may be transmitted or received using a transmission medium via coupling 2472 (e.g., a peer-to-peer coupling) to device 2470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2416 for execution by the machine 2400, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a method comprising: decoding, by at least one hardware processor, an enqueue request received from a data process of a database system, the enqueue request including a task; enqueuing the task in an in-memory task queue; encoding an enqueue acknowledgment for transmission to the data process responsive to the enqueue request; persisting the task in a storage location associated with the in-memory task queue; responsive to a lease request received from a worker node, initiating a lease of the task to the worker node; and responsive to a dequeue request received from the worker node and indicating completion of the task by the worker node, dequeuing the task from the in-memory task queue.

In Example 2, the subject matter of Example 1 includes, updating a state of the task in the storage location to a lease state, the lease state indicating the task is leased to the worker node for processing.

In Example 3, the subject matter of Example 2 includes, initiating a lease timer for a pre-configured period, the lease timer starting at a time the lease is initiated.

In Example 4, the subject matter of Example 3 includes subject matter where the dequeue request is received prior to expiration of the timer.

In Example 5, the subject matter of Examples 1–4 includes, updating the storage location based on the completion of the task and responsive to the dequeue request received from the worker node.

In Example 6, the subject matter of Examples 1-5 includes, sharding the in-memory task queue into a plurality of shards; and storing the task in a first shard of the plurality of shards.

In Example 7, the subject matter of Example 6 includes, decoding a second enqueue request received from the data process, the second enqueue request including a second task; enqueuing the second task in a second shard of the plurality of shards.

In Example 8, the subject matter of Example 7 includes, enqueuing one or more additional tasks received after the second task, wherein the one or more additional tasks are enqueued into corresponding shards of the plurality of shards in a round-robin configuration.

In Example 9, the subject matter of Examples 1-8 includes, enqueuing a second lease request received from a second worker node for a second task in the in-memory task queue; and responsive to the enqueuing of the second lease request: initiating a second lease of the second task to the second worker node; initiating a lease timer for a pre-configured period, the lease timer starting a time the second lease is initiated, and changing a state of the second task from a ready state to a leased state.

In Example 10, the subject matter of Example 9 includes, detecting the lease timer has expired; performing a revocation of the second lease; and changing the state of the second task from the leased state to the ready state.

Example 11 is a system comprising: at least one hardware processor; and at least one memory storing instructions that cause the at least one hardware processor to perform operations comprising: decoding an enqueue request received from a data process of a database system, the enqueue request including a task; enqueuing the task in an in-memory task queue; encoding an enqueue acknowledgment for transmission to the data process responsive to the enqueue request; persisting the task in a storage location associated with the in-memory task queue; responsive to a lease request received from a worker node, initiating a lease of the task to the worker node; and responsive to a dequeue request received from the worker node and indicating completion of the task by the worker node, dequeuing the task from the in-memory task queue.

In Example 12, the subject matter of Example 11 includes, the operations further comprising: updating a state of the task in the storage location to a lease state, the lease state indicating the task is leased to the worker node for processing.

In Example 13, the subject matter of Example 12 includes, the operations further comprising: initiating a lease timer for a pre-configured period, the lease timer starting at a time the lease is initiated.

In Example 14, the subject matter of Example 13 includes subject matter where the dequeue request is received prior to expiration of the timer.

In Example 15, the subject matter of Examples 11-14 includes, the operations further comprising: updating the storage location based on the completion of the task and responsive to the dequeue request received from the worker node.

In Example 16, the subject matter of Examples 11-15 includes, the operations further comprising: sharding the in-memory task queue into a plurality of shards; and storing the task in a first shard of the plurality of shards.

In Example 17, the subject matter of Example 16 includes, the operations further comprising: decoding a second enqueue request received from the data process, the second enqueue request including a second task; enqueuing the second task in a second shard of the plurality of shards.

In Example 18, the subject matter of Example 17 includes, the operations further comprising: enqueuing one or more additional tasks received after the second task, wherein the one or more additional tasks are enqueued into corresponding shards of the plurality of shards in a round-robin configuration.

In Example 19, the subject matter of Examples 11-18 includes, the operations further comprising: enqueuing a second lease request received from a second worker node for a second task in the in-memory task queue, and responsive to the enqueuing of the second lease request: initiating a second lease of the second task to the second worker node; initiating a lease timer for a pre-configured period, the lease timer starting a time the second lease is initiated, and changing a state of the second task from a ready state to a leased state.

In Example 20, the subject matter of Example 19 includes, the operations further comprising: detecting the lease timer has expired; performing a revocation of the second lease; and changing the state of the second task from the leased state to the ready state.

Example 21 is a computer-storage medium comprising instructions that, when executed by one or more processors of a machine, configure the machine to perform operations comprising: decoding an enqueue request received from a data process of a database system, the enqueue request including a task; enqueuing the task in an in-memory task queue; encoding an enqueue acknowledgment for transmission to the data process responsive to the enqueue request; persisting the task in a storage location associated with the in-memory task queue; responsive to a lease request received from a worker node, initiating a lease of the task to the worker node; and responsive to a dequeue request received from the worker node and indicating completion of the task by the worker node, dequeuing the task from the in-memory task queue.

In Example 22, the subject matter of Example 21 includes, the operations further comprising: updating a state of the task in the storage location to a lease state, the lease state indicating the task is leased to the worker node for processing.

In Example 23, the subject matter of Example 22 includes, the operations further comprising: initiating a lease timer for a pre-configured period, the lease timer starting at a time the lease is initiated.

In Example 24, the subject matter of Example 23 includes subject matter where the dequeue request is received prior to expiration of the timer.

In Example 25, the subject matter of Examples 21-24 includes, the operations further comprising: updating the storage location based on the completion of the task and responsive to the dequeue request received from the worker node.

In Example 26, the subject matter of Examples 21-25 includes, the operations further comprising: sharding the in-memory task queue into a plurality of shards; and storing the task in a first shard of the plurality of shards.

In Example 27, the subject matter of Example 26 includes, the operations further comprising: decoding a second enqueue request received from the data process, the second enqueue request including a second task; enqueuing the second task in a second shard of the plurality of shards.

In Example 28, the subject matter of Example 27 includes, the operations further comprising: enqueuing one or more additional tasks received after the second task, wherein the one or more additional tasks are enqueued into corresponding shards of the plurality of shards in a round-robin configuration.

In Example 29, the subject matter of Examples 21-28 includes, the operations further comprising: enqueuing a second lease request received from a second worker node for a second task in the in-memory task queue, and responsive to the enqueuing of the second lease request: initiating a second lease of the second task to the second worker node; initiating a lease timer for a pre-configured period, the lease timer starting a time the second lease is initiated; and changing a state of the second task from a ready state to a leased state.

In Example 30, the subject matter of Example 29 includes, the operations further comprising: detecting the lease timer has expired; performing a revocation of the second lease; and changing the state of the second task from the leased state to the ready state.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   decoding, by at least one hardware processor, an enqueue request received from a data process of a database system, the enqueue request including a task;
   enqueuing the task and one or more additional tasks in an in-memory task queue, the enqueuing based on a pre-configured queuing scheme;
   encoding an enqueue acknowledgment for transmission to the data process responsive to the enqueue request;
   persisting the task in a storage location associated with the in-memory task queue;
   responsive to a lease request received from a worker node, initiating a lease of the task to the worker node, the initiating including updating a state of the task maintained in the storage location; and
   responsive to a dequeue request received from the worker node and indicating completion of the task by the worker node, dequeuing the task from the in-memory task queue.

2. The method of claim 1, further comprising:
   updating the state of the task in the storage location to a lease state, the lease state indicating the task is leased to the worker node for processing.

3. The method of claim 2, further comprising:
   initiating a lease timer for a pre-configured period, the lease timer starting at a time the lease is initiated.

4. The method of claim 3, wherein the dequeue request is received prior to expiration of the timer.

5. The method of claim 1, further comprising:
   updating the storage location based on the completion of the task and responsive to the dequeue request received from the worker node.

6. The method of claim 1, further comprising:
   sharding the in-memory task queue into a plurality of shards; and
   storing the task in a first shard of the plurality of shards.

7. The method of claim 6, further comprising:
   decoding a second enqueue request received from the data process, the second enqueue request including a second task; and
   enqueuing the second task in a second shard of the plurality of shards.

8. The method of claim 7, further comprising:
   enqueuing one or more additional tasks received after the second task, wherein the one or more additional tasks are enqueued into corresponding shards of the plurality of shards in a round-robin configuration.

9. The method of claim 1, further comprising:
   enqueuing a second lease request received from a second worker node for a second task in the in-memory task queue; and
   responsive to the enqueuing of the second lease request:
      initiating a second lease of the second task to the second worker node;
      initiating a lease timer for a pre-configured period, the lease timer starting a time the second lease is initiated; and
      changing a state of the second task from a ready state to a leased state.

10. The method of claim 9, further comprising:
    detecting the lease timer has expired;
    performing a revocation of the second lease; and
    changing the state of the second task from the leased state to the ready state.

11. A system comprising:
    at least one hardware processor; and
    at least one memory storing instructions that cause the at least one hardware processor to perform operations comprising:
       decoding an enqueue request received from a data process of a database system, the enqueue request including a task;
       enqueuing the task and one or more additional tasks in an in-memory task queue, the enqueuing based on a pre-configured queuing scheme;
       encoding an enqueue acknowledgment for transmission to the data process responsive to the enqueue request;
       persisting the task in a storage location associated with the in-memory task queue;
       responsive to a lease request received from a worker node, initiating a lease of the task to the worker node, the initiating including updating a state of the task maintained in the storage location; and
       responsive to a dequeue request received from the worker node and indicating completion of the task by the worker node, dequeuing the task from the in-memory task queue.

12. The system of claim 11, the operations further comprising:
    updating the state of the task in the storage location to a lease state, the lease state indicating the task is leased to the worker node for processing.

13. The system of claim 12, the operations further comprising:
    initiating a lease timer for a pre-configured period, the lease timer starting a time the lease is initiated.

14. The system of claim 13, wherein the dequeue request is received prior to expiration of the timer.

15. The system of claim 11, the operations further comprising:
    updating the storage location based on the completion of the task and responsive to the dequeue request received from the worker node.

16. The system of claim 11, the operations further comprising:
sharding the in-memory task queue into a plurality of shards; and
storing the task in a first shard of the plurality of shards.

17. The system of claim 16, the operations further comprising:
decoding a second enqueue request received from the data process, the second enqueue request including a second task; and
enqueuing the second task in a second shard of the plurality of shards.

18. The system of claim 17, the operations further comprising:
enqueuing one or more additional tasks received after the second task, wherein the one or more additional tasks are enqueued into corresponding shards of the plurality of shards in a round-robin configuration.

19. The system of claim 11, the operations further comprising:
enqueuing a second lease request received from a second worker node for a second task in the in-memory task queue; and
responsive to the enqueuing of the second lease request:
initiating a second lease of the second task to the second worker node;
initiating a lease timer for a pre-configured period, the lease timer starting a time the second lease is initiated; and
changing a state of the second task from a ready state to a leased state.

20. The system of claim 19, the operations further comprising:
detecting the lease timer has expired;
performing a revocation of the second lease; and
changing the state of the second task from the leased state to the ready state.

21. A computer-storage medium comprising instructions that, when executed by one or more processors of a machine, configure the machine to perform operations comprising:
decoding an enqueue request received from a data process of a database system, the enqueue request including a task;
enqueuing the task and one or more additional tasks in an in-memory task queue, the enqueuing based on a pre-configured queuing scheme;
encoding an enqueue acknowledgment for transmission to the data process responsive to the enqueue request;
persisting the task in a storage location associated with the in-memory task queue;
responsive to a lease request received from a worker node, initiating a lease of the task to the worker node, the initiating including updating a state of the task maintained in the storage location; and
responsive to a dequeue request received from the worker node and indicating completion of the task by the worker node, dequeuing the task from the in-memory task queue.

22. The computer-storage medium of claim 21, the operations further comprising:
updating the state of the task in the storage location to a lease state, the lease state indicating the task is leased to the worker node for processing.

23. The computer-storage medium of claim 22, the operations further comprising:
initiating a lease timer for a pre-configured period, the lease timer starting a time the lease is initiated.

24. The computer-storage medium of claim 23, wherein the dequeue request is received prior to expiration of the timer.

25. The computer-storage medium of claim 21, the operations further comprising:
updating the storage location based on the completion of the task and responsive to the dequeue request received from the worker node.

26. The computer-storage medium of claim 21, the operations further comprising:
sharding the in-memory task queue into a plurality of shards; and
storing the task in a first shard of the plurality of shards.

27. The computer-storage medium of claim 26, the operations further comprising:
decoding a second enqueue request received from the data process, the second enqueue request including a second task; and
enqueuing the second task in a second shard of the plurality of shards.

28. The computer-storage medium of claim 27, the operations further comprising:
enqueuing one or more additional tasks received after the second task, wherein the one or more additional tasks are enqueued into corresponding shards of the plurality of shards in a round-robin configuration.

29. The computer-storage medium of claim 21, the operations further comprising:
enqueuing a second lease request received from a second worker node for a second task in the in-memory task queue; and
responsive to the enqueuing of the second lease request:
initiating a second lease of the second task to the second worker node;
initiating a lease timer for a pre-configured period, the lease timer starting a time the second lease is initiated; and
changing a state of the second task from a ready state to a leased state.

30. The computer-storage medium of claim 29, the operations further comprising:
detecting the lease timer has expired;
performing a revocation of the second lease; and
changing the state of the second task from the leased state to the ready state.

* * * * *